US010977710B2

(12) United States Patent
Axelsson et al.

(10) Patent No.: US 10,977,710 B2
(45) Date of Patent: Apr. 13, 2021

(54) SYSTEMS AND METHODS FOR TRACKING CONSUMER TASTING PREFERENCES

(71) Applicant: The Bottlefly, Inc., Paso Robles, CA (US)

(72) Inventors: Katerina Axelsson, San Luis Obispo, CA (US); Alexander Dekhtyar, San Luis Obispo, CA (US); Toshihiro Kuboi, San Luis Obispo, CA (US); Foaad Khosmood, San Luis Obispo, CA (US); Evan Lanuza, Paso Robles, CA (US); Timothy Scott, Clovis, CA (US); Eric Thorndyke, Claremont, CA (US)

(73) Assignee: The Bottlefly, Inc., San Luis Obispo, CA (US)

( * ) Notice: Subject to any disclaimer, the term of this patent is extended or adjusted under 35 U.S.C. 154(b) by 714 days.

(21) Appl. No.: 15/359,518

(22) Filed: Nov. 22, 2016

(65) Prior Publication Data

US 2017/0148084 A1   May 25, 2017

Related U.S. Application Data

(60) Provisional application No. 62/259,516, filed on Nov. 24, 2015.

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06F 7/026* (2013.01); *G06F 16/22* (2019.01); *G06F 16/2457* (2019.01); *G06F 16/9535* (2019.01)

(58) Field of Classification Search
CPC .. G06Q 30/0601–0645; G06Q 30/0631; G06F 16/22; G06F 16/2457; G06F 16/9535; G06F 7/026
(Continued)

(56) References Cited

U.S. PATENT DOCUMENTS 5,200,909 A * 4/1993 Juergens ................ G01N 33/14
                                                          436/24
7,593,863 B1   9/2009 Sunshine
(Continued)

FOREIGN PATENT DOCUMENTS

JP   2006190126   7/2006
JP   2006190127   7/2006
(Continued)

OTHER PUBLICATIONS

Biggs, John. Likelii Is a Database of Booze That Bends to Your Whims. Dec. 13, 2012 (Dec. 13, 2012). Published by TechCrunch. (Year: 2012).*
(Continued)

*Primary Examiner* — Allison G Wood
(74) *Attorney, Agent, or Firm* — Fitch, Even, Tabin & Flannery LLP

(57) ABSTRACT

Systems and methods for recommending an item from a plurality of items. The plurality of items includes chemistry-based features. The system comprises a computing device and a database. The database includes user preference data, item data, and mapping data. The system receives user input regarding user preferences, and associates user preference values with chemistry-based feature values. The system compares chemistry-based feature values for each item to the user preference values and returns items that best match. In one embodiment, the items are wines and the system uses
(Continued)

chemistry-based features of wines such as wine volatile chemical compounds to return wine recommendations.

21 Claims, 31 Drawing Sheets

(51) Int. Cl.
*G06F 16/22* (2019.01)
*G06F 16/2457* (2019.01)
*G06F 7/02* (2006.01)
*G06F 16/9535* (2019.01)

(58) Field of Classification Search
USPC ............. 705/26.1–27.2, 26.7, 26.61, 26.64
See application file for complete search history.

(56) References Cited

U.S. PATENT DOCUMENTS

| | | | |
|---|---|---|---|
| 8,751,429 | B2 | 6/2014 | Dillon |
| 9,026,484 | B2 | 5/2015 | Dillon |
| 9,449,077 | B2 | 9/2016 | Dillon |
| 10,127,598 | B2 | 11/2018 | Dillon |
| 2004/0181445 | A1 | 9/2004 | Kolsky |
| 2006/0026048 | A1 | 2/2006 | Kolawa |
| 2008/0160147 | A1 | 7/2008 | Tormey |
| 2008/0243638 | A1* | 10/2008 | Chan ............ G06Q 30/02 705/14.51 |
| 2009/0210321 | A1 | 8/2009 | Rapp |
| 2012/0116840 | A1 | 5/2012 | Omer |
| 2012/0226698 | A1 | 9/2012 | Silvestre |
| 2013/0080438 | A1 | 3/2013 | Tompkins |
| 2013/0332809 | A1 | 12/2013 | Pickelsimer |
| 2013/0339348 | A1* | 12/2013 | Pickelsimer ...... G06Q 30/0631 707/723 |
| 2014/0143015 | A1 | 5/2014 | Killam |
| 2014/0229498 | A1 | 8/2014 | Dillon |
| 2014/0324624 | A1* | 10/2014 | Ward .............. H04W 4/021 705/26.7 |
| 2014/0351270 | A1 | 11/2014 | Koike |
| 2015/0046471 | A1* | 2/2015 | Tompkins ............ G06F 16/955 707/748 |
| 2015/0205801 | A1 | 7/2015 | Tompkins |
| 2015/0235136 | A1 | 8/2015 | Dillon |

FOREIGN PATENT DOCUMENTS

| | | |
|---|---|---|
| JP | 2006190128 | 7/2006 |
| WO | 20140153445 | 9/2014 |

OTHER PUBLICATIONS

Brattoli et al; "Gas Chromatography Analysis with Olfactometric Detection (GC-O) as a Useful Methodology for Chemical Characterization of Odorous Compounds"; Sensors 2013, Dec. 5, 2013; pp. 16759-16800.
Drive Thru Interactive; "Hello Vino—Wine Guide—Recommendations, Ratings and Scanner on the App Store on iTunes"; May 22, 2015; https://itunes.apple.com/us/app/hello-vino-wine-guide-recommendations/id318447346?mt=8; retrieved Jul. 25, 2015; 5 pages.
Flamini et al; "Mass Spectrometry in Grape and Wine Chemistry"; Wiley Series on Mass Spectrometry; 2010; 366 pages.
International Search Report and Written Opinion of the International Searching Authority for PCT/US2016/063422 mailed from the International Searching Authority dated Mar. 8, 2017.
Extended European Search Report for EP16869200.2 mailed from the European Patent Office dated Apr. 11, 2019.
Communication pursuant to Article 94(3) EPC for EP 16869200.2 mailed from the European Patent Office dated May 8, 2020.
Search Report for BR112018010552-0 issued by the Brazil Federal Public Service Ministry of Development, Industry and Foreign Commerce National Institute of Industrial Property dated Jul. 13, 2020.
Office Action issued in JP Patent Application No. 2018-545578 mailed from the Japan Patent Office dated Dec. 1, 2020.

\* cited by examiner

| Term<br>1402　1404<br>Item ID | Zesty | Soft | Flat | Heavy | Young | Mature | Crisp | Casual | ... |
|---|---|---|---|---|---|---|---|---|---|
| 1 | 0 | 0 | 1 | 0 | 1 | 1 | 1 | 0 | ... |
| 2 | 1 | 1 | 1 | 0 | 0 | 0 | 1 | 1 | ... |
| 3 | 1 | 0 | 1 | 0 | 1 | 1 | 0 | 1 | ... |
| ... | ... | ... | ... | ... | ... | ...1406 | ... | ... | ... |
| N | 1 | 1 | 0 | 0 | 0 | 1 | 0 | 1 | ... |

FIG. 14

| Term<br>1502　1404<br>Cluster ID | Zesty | Soft | Flat | Heavy | Young | Mature | Crisp | Casual | ... |
|---|---|---|---|---|---|---|---|---|---|
| 1 | 0 | 0 | 1 | 0 | 1 | 1 | 1 | 0 | ... |
| 2 | 1 | 1 | 1 | 0 | 0 | 0 | 1 | 1 | ... |
| 3 | 1 | 0 | 1 | 0 | 1 | 1 | 0 | 1 | ... |
| ... | ... | ... | ... | ... | ... | ...1506 | ... | ... | ... |
| N | 1 | 1 | 0 | 0 | 0 | 1 | 0 | 1 | ... |

FIG. 15

| Chemistry Feature / Response # | Alc | Tan | Oak | TA | RS | ML | VS | ... |
|---|---|---|---|---|---|---|---|---|
| 1 | 0 | 0 | +1 | 0 | -1 | +1 | +1 | 0 |
| 2 | -1 | +1 | -1 | 0 | 0 | 0 | +1 | +1 |
| 3 | +2 | 0 | -1 | 0 | -2 | +1 | 0 | -1 |

FIG. 19

| Chemistry Feature / User # | Alc. | Oak | TA | RS | VS | ML | TAN | ... |
|---|---|---|---|---|---|---|---|---|
| 1 | 7 | 3 | 4 | 3 | 2 | 5 | 3 | ... |
| 2 | 2 | 5 | 6 | 2 | 7 | 3 | 4 | ... |
| 3 | 4 | 5 | 1 | 5 | 5 | 2 | 7 | ... |
| ... | ... | ... | ... | ... | ... | ... | ... | ... |

| Flavor Feature / User # | Cran-berry | Oak | cherry | vanilla | earth | Black-berry | bell pepper | ... |
|---|---|---|---|---|---|---|---|---|
| 1 | 7 | 3 | 4 | 3 | 2 | 5 | 3 | ... |
| 2 | 2 | 5 | 6 | 2 | 7 | 3 | 4 | ... |
| 3 | 4 | 5 | 1 | 5 | 5 | 2 | 7 | ... |
| ... | ... | ... | ... | ... | ... | ... | ... | ... |

2002 (User #), 2106

FIG. 21

2702 — What occassion are you looking to buy a wine for? (Select one)

| Dinner | |
|---|---|
| Lunch | |
| A Party | 2704 |
| A Date | |
| No particular occassion | |

2802 — Which wine color(s) would you like recommended? (Select one or more)

| White Wines | |
|---|---|
| Red Wines | |
| Rosé Wines | 2804 |
| Any Wine | |

| Chemical Com-pound 3504 / User # 2002 | Esters (white flowers, banana, raspberry, strawberry, apple) | Pyrazines (Grass, edleflower, peas, chocolate, bell pepper) | Terpenes (rose, lychee, lavender, citrus) | Thiols (Grapefruit, Gooseberry, blackcurrant, passionfruit) | Sulfur (Earthy, chalk, rock, flint) | ... |
|---|---|---|---|---|---|---|
| 1 | 7 | 3 | 4 | 3 | 2 | ... |
| 2 | 2 | 5 | 6 | 2  3506 | 7 | ... |
| 3 | 4 | 5 | 1 | 5 | 5 | ... |
| ... | ... | ... | ... | ... | ... | ... |

| | | | | |
|---|---|---|---|---|
| Citrus | Pineapple | Roses | Tobacco | Violets |
| Floral | Orange blossom | Orange peel | Peach | Lime |
| Fruity | Grassy | Green Beans | Saffron | Fig |
| Grapefruit | Toast | Apple | Butter | Pear |
| Lemon | Cinnamon | Lemongrass | Papaya | Anise |
| Oaky | Sweet | Vanilla | Banana | Toasted Coconut |
| Perfumed | Cucumber | Gooseberry | Mandarin | Lime |
| Melon | Nectarine | Prune | Caramel | Mango |
| Strawberry | Cashew | Cedar | Charred | Cheesy |
| Biscuit | Leesy | Sawdust | Aromatic | Black Cherry |
| Bread | Black Pepper | Cranberry | Black Currant | Peonies |
| Dough | Raspberry | Sour Cherry | Tar | White Pepper |
| Hazelnut | Earthy | Grilled Meat | Tree Moss | Chocolate |
| Honey | Bubble gum 2104 | Coconut | Cotton Candy | Jasmine |
| Nutty | Fragrant | Green Apple | Lavender | Orange peel |
| Oysters | Passionfruit | Clove | Kerosene | Gingerbread |
| Savory | Lychee | Potpourri | Mint | Musk |
| Toast | Bacon | Earthy | Leather | Mushroom |
| Cherries | Truffle | Vanilla | Meaty | Gamey |
| Cranberry | Smoky | Nutty | Olive | Coffee |
| Marzipan | Herbal | Licorice | Spicy | Nutmeg |
| Pansies | Soy | Cedar | Walnut | Inky |
| Peonies | Dusty | Almond | Tar | Coffee |
| Pepper Plum | Raspberry | Blueberry | Menthol | Candied |
| Red currant | Mandarin | Mango | Molasses | Straw |
| Spicy | Musty | Caramel | Oxidised | Reduced |
| Watermelon | Leather | Macaroon | Mushroom | Truffle |
| Aromatic | Dried fruit | Forest floor | Hay | Minerally |

3600

SYSTEMS AND METHODS FOR TRACKING CONSUMER TASTING PREFERENCES

This application claims the benefit of U.S. Provisional Application No. 62/259,516, filed Nov. 24, 2015, entitled RECOMMENDATION SYSTEM, which is incorporated in its entirety herein by reference.

BACKGROUND OF THE INVENTION

1. Field of the Invention

The present invention relates generally to sensory item selection, and more specifically to wine selection.

2. Discussion of the Related Art

Selecting a wine from the vast number and types of wines available is often difficult for the average wine consumer. Wine sensory characteristics such as odors and flavors, while essential to determining whether the consumer will prefer the wine or not, are not generally accessible to the consumer buying a bottle of wine at a grocery store or other general retailer. Additionally, even if wine characteristics such as flavors (peach, leather, vanilla, etc.) are provided to the consumer, it may not be apparent to the consumer how the listed flavors translate to actual wine taste and preference.

To aid consumers in selecting wine, various methods and systems have been developed. Stores may provide crowd-sourcing techniques that may include reviews of wines by other consumers, which act as a guide for the consumer. Other systems may use data such as scoring of wines by experienced wine panelists, location of wine origin and/or varietal of wine to provide wine recommendations. Still other systems may use question responses and/or other data from the consumer to develop a profile for the consumer that is used to provide recommendations to the consumer.

Other than basic parameters such as the varietal of wine, the wine recommendation systems and methods previously developed rely on subjective opinions (by the consumer, experts, and/or reviewers) which can vary widely and result in unreliable responses of the wine recommendation system.

SUMMARY OF THE INVENTION

Several embodiments of the invention advantageously address the needs above as well as other needs by providing an item recommendation system comprising: a database including data for a plurality of items, the data including a value for at least one chemistry-based item feature; a computing device comprising a processor; at least one recommendation module configured to run on the processor and configured to perform the steps of: receive at least one user preference response indicating a user preference for a sensory characteristic of the plurality of items; associate each user preference response with a user preference value associated with at least one chemistry-based feature; compute a relevancy score for each item based at least in part on comparing the user preference value associated with at least one chemistry-based feature with the item value for the associated chemistry-based feature; and recommend at least one item based at least in part on the relevancy score of the at least one item.

In another embodiment, the invention can be characterized as an item recommendation system comprising: a database including data for a plurality of item clusters, the data including a value for at least one chemistry-based cluster feature, each cluster including a plurality of items associated with the cluster; a computing device comprising a processor; at least one recommendation module configured to run on the processor and configured to perform the steps of: receive at least one user preference response indicating a user preference for a sensory characteristic of the plurality of items; associate each user preference response with a user preference value associated with at least one chemistry-based feature; select one cluster of items based at least in part on comparing the user preference value associated with the at least one chemistry-based feature with the at least one chemistry-based cluster feature.

In yet another embodiment, the invention may be characterized as a method for recommending an item, comprising the steps of: receiving, by a recommendation system comprising a database including data for a plurality of items, the data including a value for at least one chemistry-based item feature, the recommendation system further comprising a computing device comprising a processor and at least one recommendation module configured to run on the processor, at least one user preference response indicating a user preference for a sensory characteristic of the plurality of items; associating, by at least one recommendation module, each user preference response with a user preference value associated with at least one chemistry-based feature; computing, by at least one recommendation module, a relevancy score for each item based at least in part on comparing the user preference value associated with at least one chemistry-based feature with the item value for the associated chemistry-based feature; and recommending at least one item based at least in part on the relevancy score of the at least one item.

BRIEF DESCRIPTION OF THE DRAWINGS

The above and other aspects, features and advantages of several embodiments of the present invention will be more apparent from the following more particular description thereof, presented in conjunction with the following drawings.

FIG. 14 is a term-to-item mapping table.

FIG. 15 is a term-to-cluster mapping table.

FIG. 19 is a chemistry feature-to-response mapping table.

FIG. 20 is a chemistry feature-to-user mapping table.

FIG. 21 is an flavor-to-user mapping table.

FIG. 27 is an illustration of a first context-based user interface for a first context-based question.

FIG. 28 is an illustration of a second context-based user interface for a second context-based question.

FIG. 35 is a chemical compound-to-user mapping table.

FIG. 36 is a chart of flavor descriptors.

Figure 1:
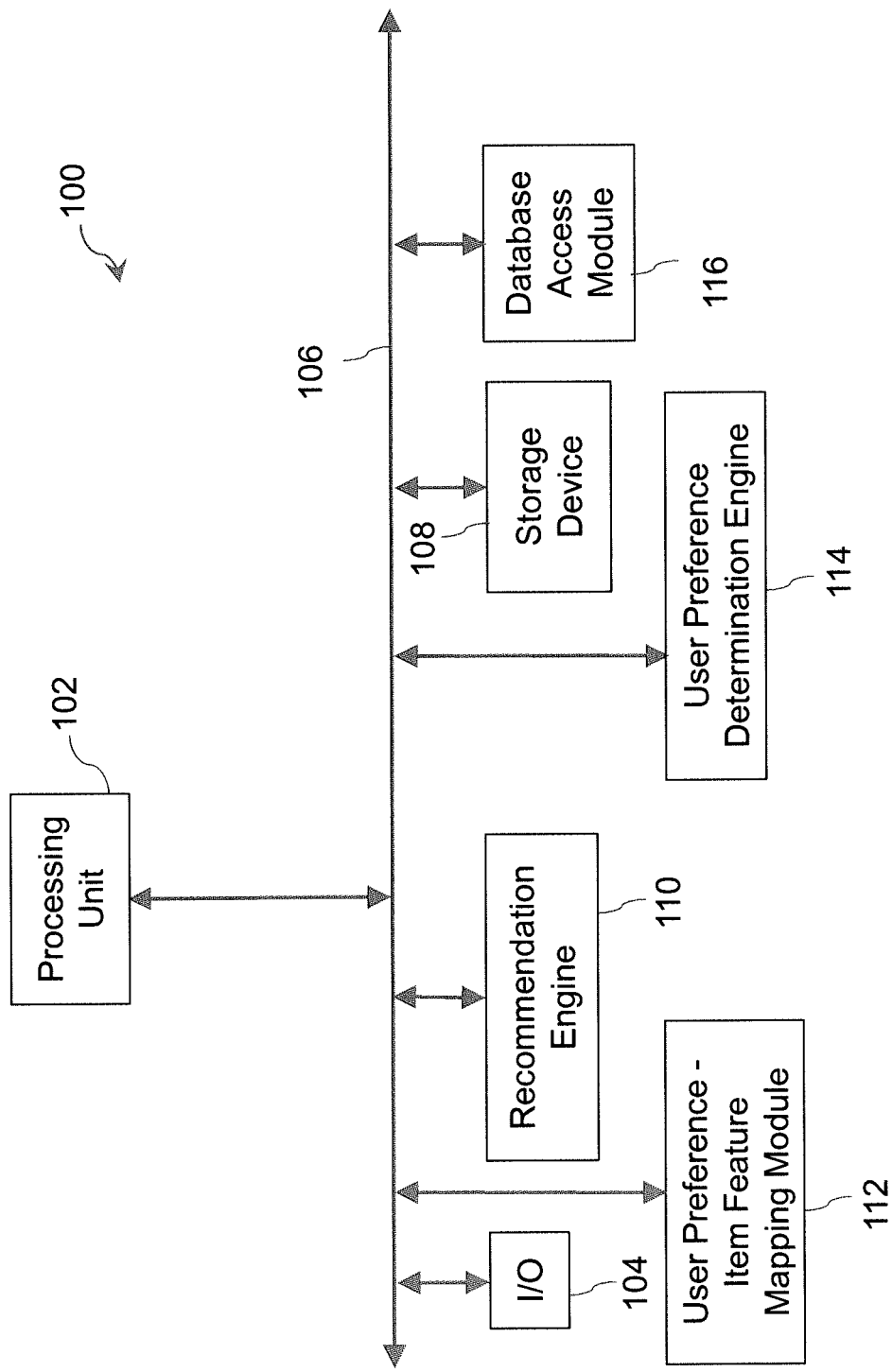
FIG. 1 is a schematic diagram of a first recommendation system in a first embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a schematic diagram of a first recommendation system 100 in a first embodiment of the present invention is shown. Shown are a processing unit 102, an input/output module 104, a system bus 106, a storage device 108, a recommendation engine 110, a user preference-item feature mapping module 112, a user preference determination engine 114, and a database access module 116.

The processing unit 102, the input/output module 104, the storage device 108, the recommendation engine 110, the user preference-item feature mapping module 112, the user preference determination engine 114, and the database access module 116 are all interactively coupled via the system bus 106.

The processing unit 102 includes at least one computer processor and associated non-transitory memory and is configured to provide processing for the various software, modules, and other computing components described herein. The input/output module 104 is configured to provide communication outside the first recommendation system 100.

Figure 8:
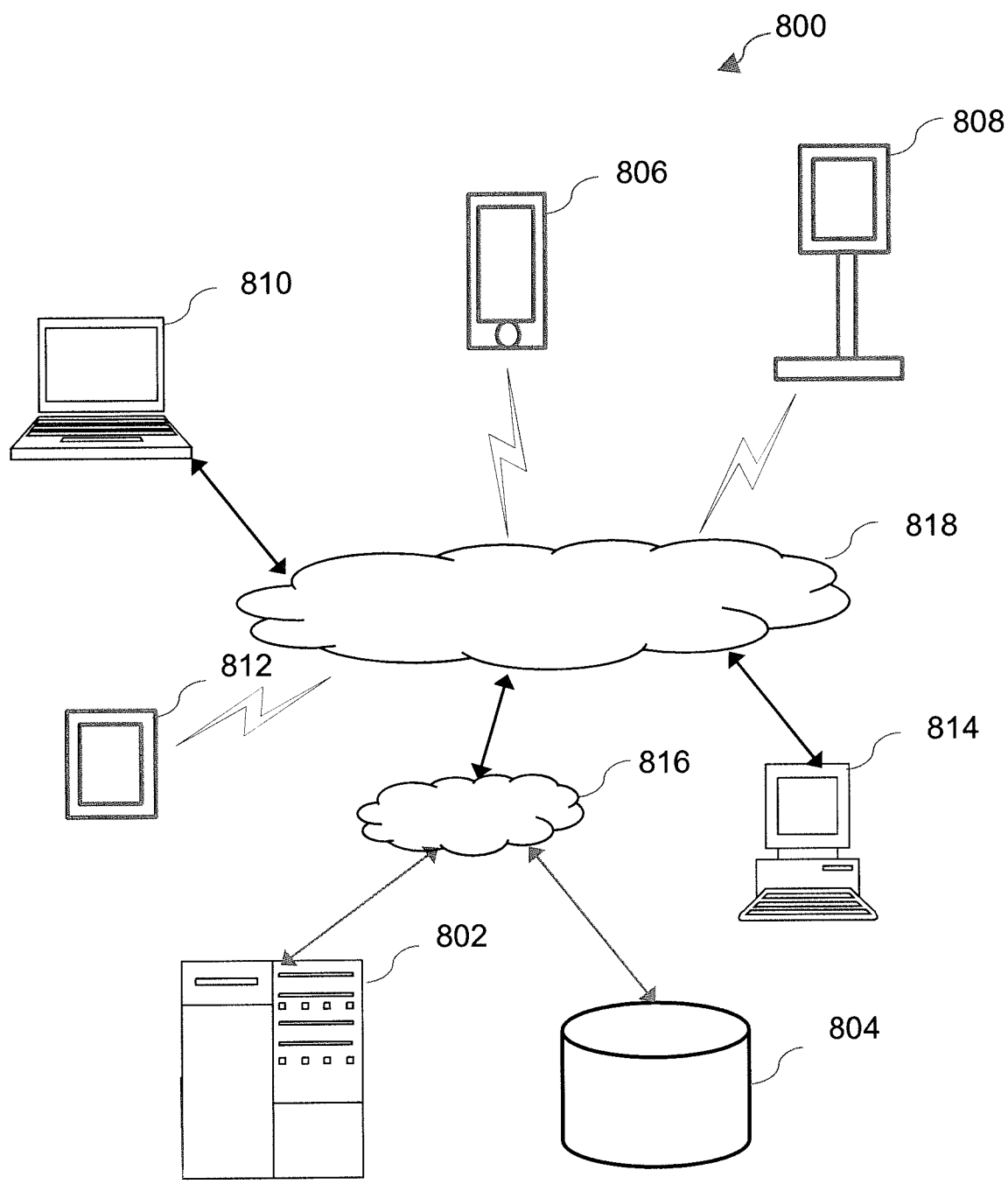
FIG. 8 is a schematic diagram of a first exemplary network recommendation system.

The storage device 108 is configured to store data accessed by one or more modules. All required data may be stored on the internal storage device 108 or a portion of the data may be stored on a separate database as shown in FIG. 8 and accessed by the first system 100 via the database access module 116. Data required for operation of the system is detailed further below in FIGS. 10 and 11.

The recommendation engine 110 is configured to use stored data, user input and/or results from other modules to return an item recommendation. The recommendation process is described further below, but in summary the recommendation engine computes a relevancy score for each item and presents items for which the computed score is higher than a predetermined threshold, or a predetermined number of items with the highest relevancy scores. For example, for wine items the recommendation engine computes a relevancy score for each wine based on a user's preference for wine chemistry-based features.

Item features are any tangible, measurable property of a specific item. The features used in the embodiments disclosed herein are typically chemistry-based features (i.e., the measured quantity of a specific chemical compound in a given item), descriptive features (e.g., the vintage of a wine, or the geographic area where it was produced), aggregate features (e.g., a feature quantifying the presence of "fruit" in the wine, which aggregates information about the presence of several chemical compounds), sensory features (e.g., a feature documenting the presence or absence of a specific detectable aroma or taste). Other item feature types can be used in additional embodiments (e.g., information about the number of times a wine has already been recommended to some customer).

Chemistry-based features include item properties derived from chemical analysis of the item and/or chemical properties of the item. Chemistry-based features include chemical compounds found in the item. For example, chemical analysis has identified chemical compounds found in wine. Each chemical compound identified in wine is a chemistry-based feature. Examples of chemical compounds identified in wine include ethyl acetate, citronellol, decanal, 2-phenylethyl, diethyl sulfide, and many others. Tables including additional chemical compounds identified in wine are included in the reference "Mass Spectrometry in Grape and Wine Chemistry" by Flamini et al., published 2003, and incorporated in its entirety herein by reference.

In addition to chemical compounds of the item, chemistry-based features include other identifiable chemical properties of the item. Identifiable chemical properties include percent alcohol, total acidity, percent residual sugar, viscosity, presence of chemical compounds associated with malo-actic fermentation, and quantity of tannin.

In one example, the relevancy score is obtained by computing a Euclidean distance between user preference values associated with chemistry-based features (e.g. the user preference values for wine include Oak=5, TA=5, RS=5, where Oak, TA and RS refer to chemistry-based features) and the corresponding values of the item (e.g. values for a specific wine are Oak=3, TA=7, RS=3), as the square root of the sum of the squares of the difference between each value. In the example, the relevancy score for the user and item examples would be $\sqrt{[(5-3)^2+(5-7)^2+(5-3)^2]}=3.4641$.

In some embodiments, the items may be clustered into groups (also referred to as clusters) prior to computing the recommendation, wherein the item group (cluster) is selected in lieu of selecting individual items, as described further below. In other embodiments the relevancy score is computed each item selected by the term-to-cluster mapping module 202 described below in FIG. 2.

The user preference-item feature mapping module 112 creates and updates a user preferences data file 1008 for each unique user which includes individual values associated with quantitative or otherwise identifiable chemistry-based features of the item, such as presence of a specific chemical compound or a chemical property such as percent alcohol. In some embodiments, the chemistry-based feature is mapped to a descriptor such as a flavor, and the data file associates the user with a value for each descriptor. Examples of flavor descriptors are shown below in FIG. 36.

The user preference determination engine 114 is configured to obtain data regarding user preference, which is then used by the user preference-item feature mapping module 112 to update the user preference data file 1008 to include the user preference data. In one embodiment the user preference determination engine 114 presents questions and receives responses on how the user prefers to eat foods and drink beverages. In other embodiments the user preference determination engine 114 presents a plurality of descriptors for the user to select, which are then used to update the user preference data file 1008 and/or sent to the recommendation engine 110 for use in computation of the relevancy scores. In other embodiment the user preference determination engine 114 obtains user preference data from other data sources such as a user purchase history.

The database access module 116 connects to and retrieves data from the separate database.

Figure 2:
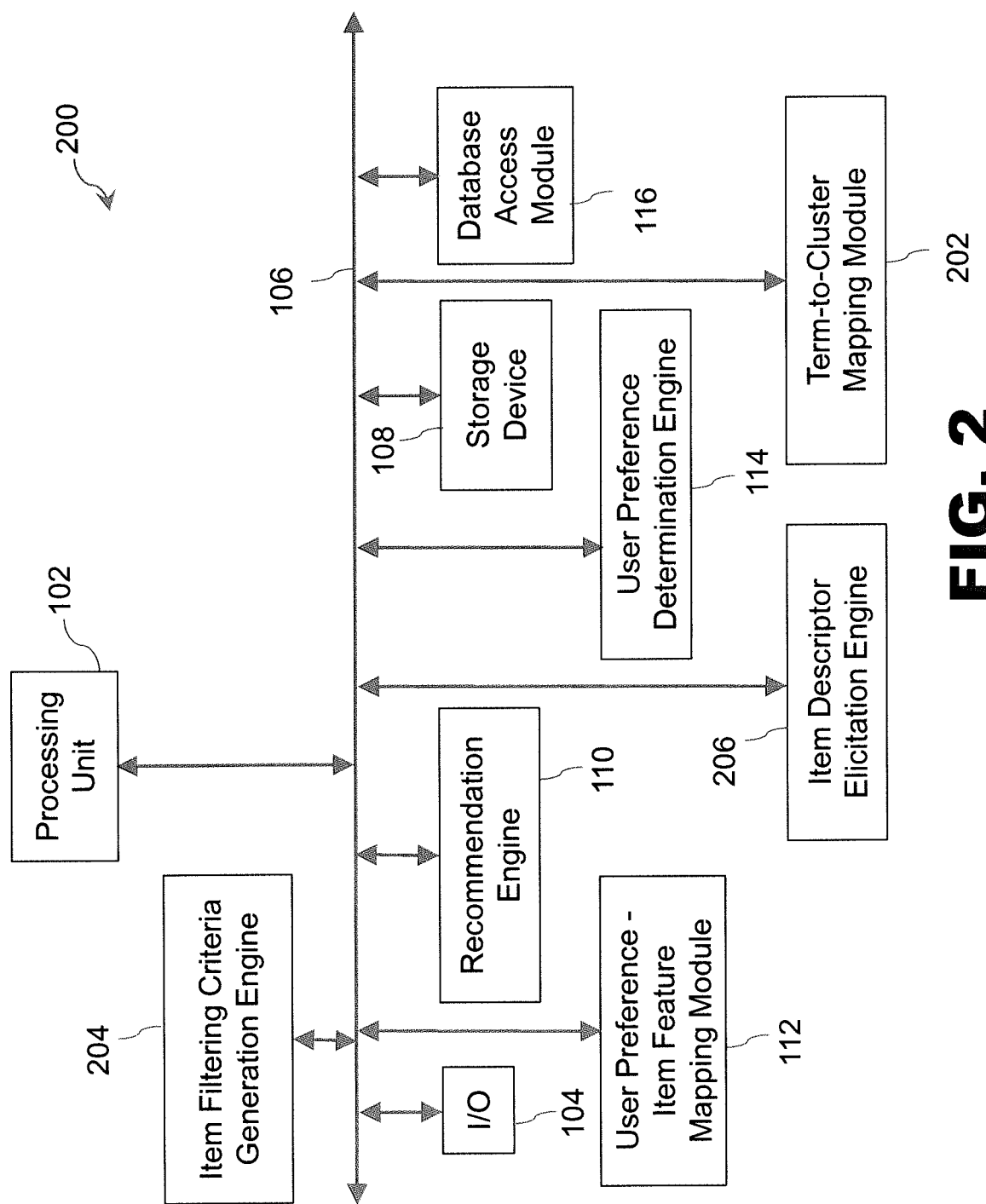
FIG. 2 is a schematic diagram of a second recommendation system in another embodiment of the present invention.

Referring next to FIG. 2, a schematic diagram of a second recommendation system 200 in another embodiment of the present invention is shown. Shown are the processing unit 102, the input/output module 104, the system bus 106, the storage device 108, the recommendation engine 110, the user preference-item feature mapping module 112, the user preference determination engine 114, the database access module 116, the term-to-cluster mapping module 202, an item filtering criteria generation engine 204, and an item descriptor elicitation engine 206.

The second recommendation system 200 includes the components of the first recommendation system 100, as well as additional elements coupled to the system bus 106.

The term-to-cluster mapping module 202 determines a cluster or clusters which best match a selected descriptor or descriptors. For example, the term-to-cluster mapping module 202 computes the relevancy score for each cluster with respect to a selected descriptor or a plurality of descriptors (such as "oaky" or "sweet"). The term-to-cluster mapping module 202 then returns one or more clusters of items with the highest relevancy score with respect to the selected descriptor or descriptors. For example, each cluster is associated with a vector including values for various terms (descriptors), e.g. [term 1 value, term 2 value, term 3 value, . . . , term n value]. If the term-to cluster mapping module 202 receives input of the term 1 value=1 and the term 3 value=3, the term-to-cluster mapping module 202 returns the cluster or clusters which have the term 1 value equal to 1 and the term 3 value also equal to 1. Examples of flavor descriptors 2014 are shown below in FIGS. 21 and 36

In the second recommendation system 200, the term-to-cluster mapping module 202 sends the cluster or clusters matched by the terms (descriptors) to the recommendation engine 110, which then computes relevancy scores for the items in the cluster as previously described.

The item filtering criteria generation engine 204 is configured to present at least one contextual and/or filtering question to the user and accept a response to each question. Examples of contextual/filtering questions are shown below in FIGS. 26-29. An example of a process using the item filtering criteria generation engine 204 is shown below in FIG. 26. The item filtering criteria generation engine 204 generates a filtering criteria based on the response to the at least one contextual and/or filtering question. The filtering criteria is sent to the recommendation engine 110. For example, a generated filtering criteria could be "select sparkling wines or rosé still wines from the inventory". The recommendation engine, after receiving the filtering criteria, would either recommend wines from the filtered wine list or filter wines after generating the list of recommended wines.

Figure 31:
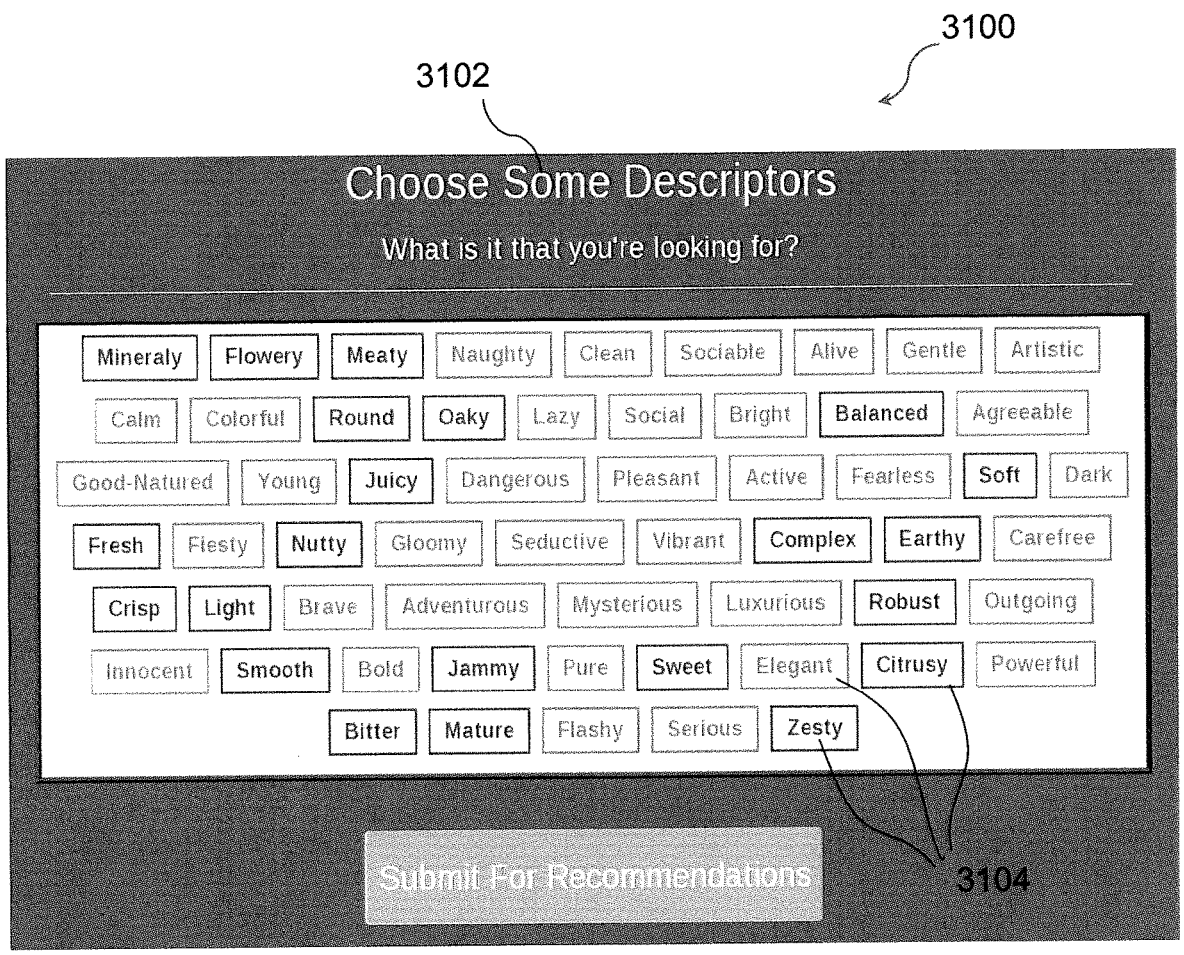
FIG. 31 is an illustration of a term selection user interface.

The item descriptor elicitation engine 206 is configured to present to the user a plurality of descriptors and receives user input selecting at least one descriptor. The descriptive terms may be nouns, adjectives, or both. An example of a user interface presented to the user by the item descriptor elicitation engine 206 for selecting descriptors is shown in FIG. 31.

Figure 3:
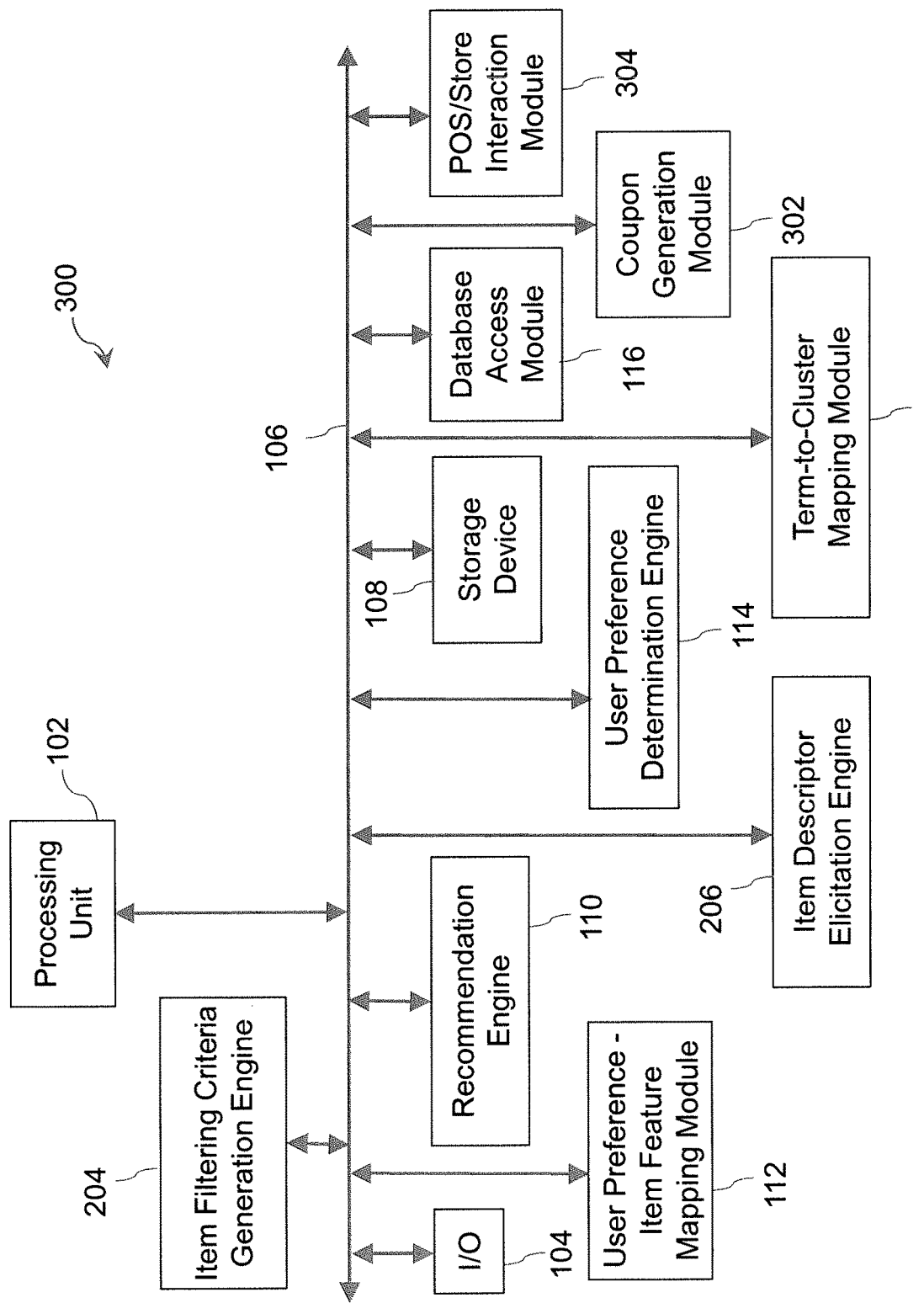
FIG. 3 is a schematic diagram of a third recommendation system in another embodiment of the present invention.

Referring next to FIG. 3, a schematic diagram of a third recommendation system 300 in another embodiment of the present invention is shown. Shown are the processing unit 102, the input/output module 104, the system bus 106, the storage device 108, the recommendation engine 110, the user preference-item feature mapping module 112, the user preference determination engine 114, the database access module 116, the term-to-cluster mapping module 202, the item filtering criteria generation engine 204, the item descriptor elicitation engine 206, a coupon generation module 302 and a POS/store interaction module 304.

The third recommendation system 300 includes the components of the second recommendation system 200, as well as additional elements of the coupon generation module 302 and the POS/store interaction module 304 also coupled to the system bus 106.

The POS/store interaction module 304 connects to a POS system for a store and/or connects to a store inventory system of the store. POS/store interaction module 304 is configured to obtain inventory data from the connected store. The inventory data may be used to determine how many of each item type (for example, each item SKU) are available at the store location, in order to avoid recommending an item not currently in stock at the store. If the store has an associated planogram, the POS/store interaction module 304 can obtain the planogram and use the planogram to find the physical location of any inventory item in the store. The POS/store interaction module 304 can also be used to connect directly to software running on a cash register system of the store and pass information to the cash register system, for example information for a coupon to be used during purchase, and/or a customer's loyalty card number.

The coupon generation module 302 generates coupons for items. The coupon generation process is described further below in FIG. 32. In some embodiments coupons may also come directly from the producer/brand, in lieu of being generated as part of a promotion from a store. Additionally, in some embodiments the coupon generation module 302 can interact directly with the POS/store interaction module 304 by configuring the POS/store interaction module 304 to pass coupon information directly to the POS system.

Figure 4:
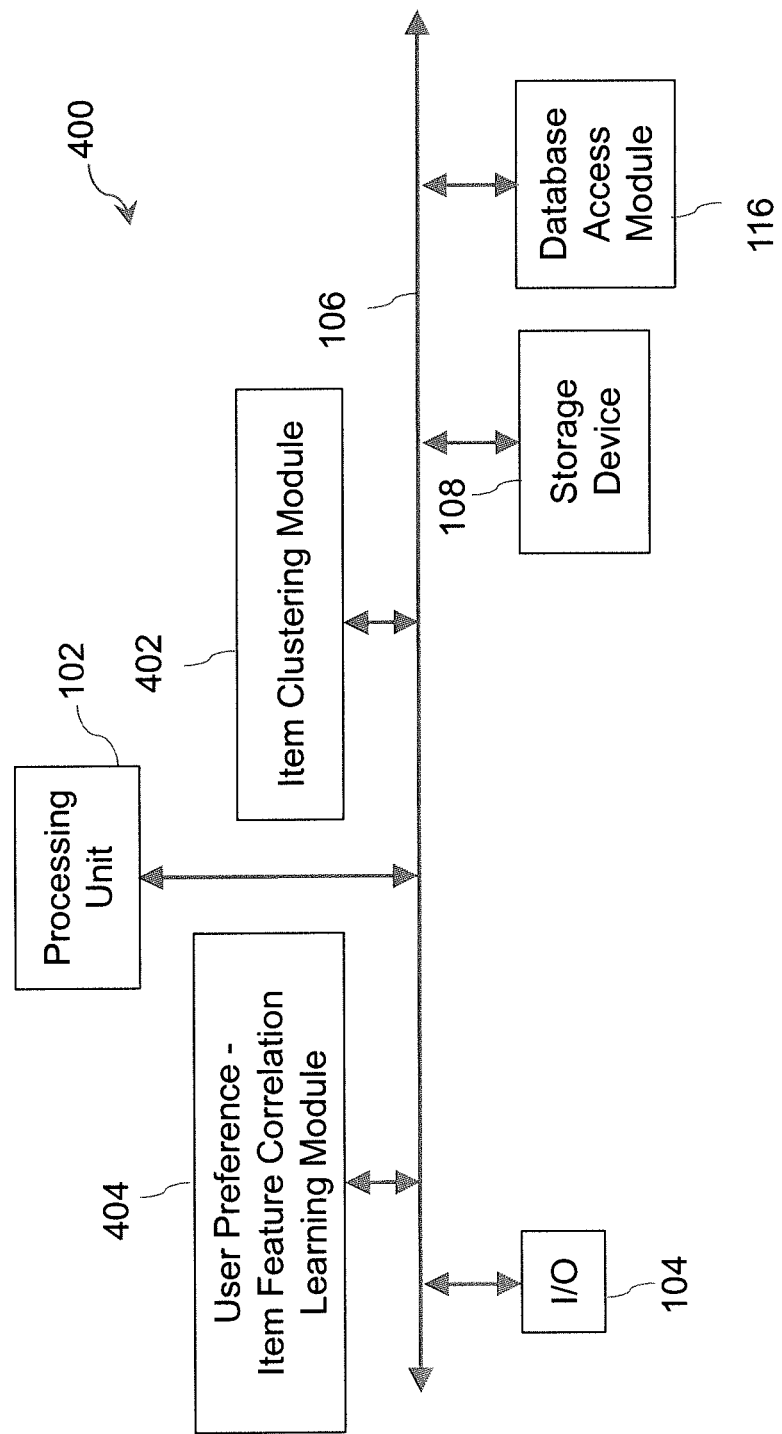
FIG. 4 is a schematic diagram of a first learning system in another embodiment of the present invention.

Referring next to FIG. 4, a schematic diagram of a first learning system 400 in another embodiment of the present invention is shown. Shown are the processing unit 102, the input/output module 104, the system bus 106, the storage device 108, the database access module 116, an item clustering module 402, and a user preference-item feature correlation learning module 404.

The first learning system 400 includes the processing unit 102, the input/output module 104, the system bus 106, the storage device 108, and the database access module 116 coupled as previously described. The first learning system 400 also includes the item clustering module 402 and the user preference-item feature correlation learning module 404 coupled to the system bus 106. The first learning system 400 is configured to learn the correlation (mapping, correspondence) between user preferences and selected item features. Examples of mapping tables generated by the first learning system 400 are shown below in FIGS. 19 and 20.

The item clustering module 402 is configured to identify a plurality of groups/clusters, assign each item to a cluster and store data regarding cluster assignments. In one embodiment a number of clusters is predetermined and the items are then divided into the predetermined clusters using a clustering algorithm such as Agglomerative Clustering, K-means, or Ward hierarchical clustering. In another embodiment, the number of clusters is determined by a clustering algorithm such as Birch, DBSCAN or Mean-shift. In other embodiments, the items are clustered by a person. In one embodiment a center of a cluster is determined by computing a mean value of each item feature (i.e. each data point associated with the item) in feature space. Each item is assigned to the closest cluster in Euclidean space. In the typical embodiment, a representative item for each cluster is selected and stored. The representative item can be selected by a person or by using an algorithm. In one embodiment, the representative item is the item closest to the cluster center.

The user preference-item feature correlation learning module 404 is configured to relate data regarding user preference to one or more item features, i.e. map the user preference to the item features. The user preference-item feature correlation learning module 404 receives user information/data (such as that produced by the user taking a quiz) and item feature data and produces correlation/mapping data, such as that shown below in FIGS. 19 and 20.

Figure 5:
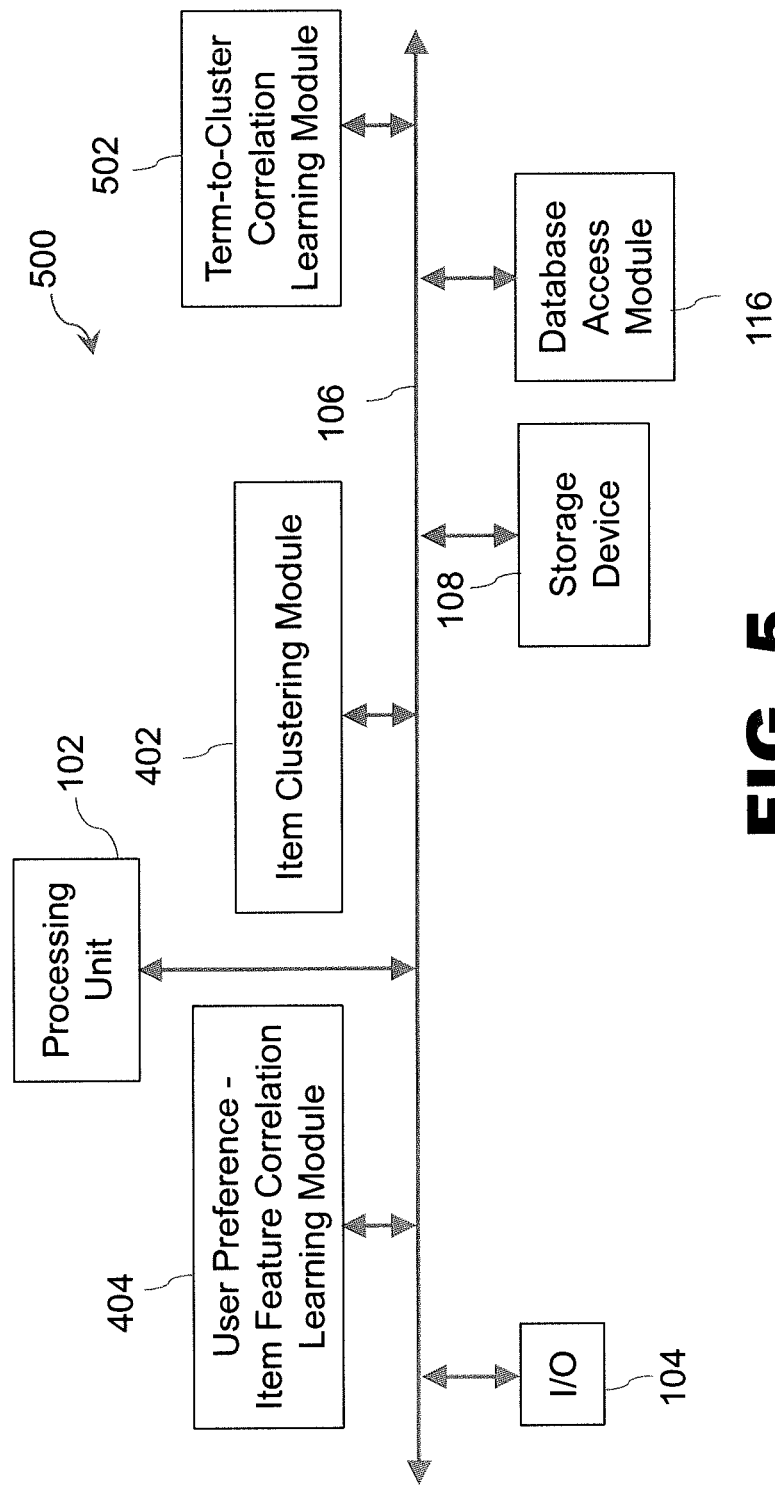
FIG. 5 is a schematic diagram of a second learning system in another embodiment of the present invention.

Referring next to FIG. 5, a schematic diagram of a second learning system 500 in another embodiment of the present invention is shown. Shown are the processing unit 102, the input/output module 104, the system bus 106, the storage device 108, the database access module 116, the item clustering module 402, the user preference-item feature correlation learning module 404, and a term-to-cluster correlation learning module 502.

The second learning system 500 includes the components of the first learning system 400, as well as the term-to-cluster correlation learning module 502 also coupled to the system bus 106.

The term-to-cluster correlation learning module 502 is configured to build the mapping subsequently used by the term-to-cluster mapping module 202 by learning the correlation between the term and the clusters. In some embodiments, the learning is machine learning. The term-to-cluster correlation learning module 502 processes a collection of data wherein each individual item record includes item-term pairing. The term-to-cluster correlation learning module 502 retrieves chemistry-based features of each item from the database 804 and computes an association between each chemistry-based feature and each term. In some embodiments, from the chemistry-based feature-term association the term-to-cluster correlation learning module 502 determines an item-term association even when chemistry-based data is not available for that item.

Figure 6:
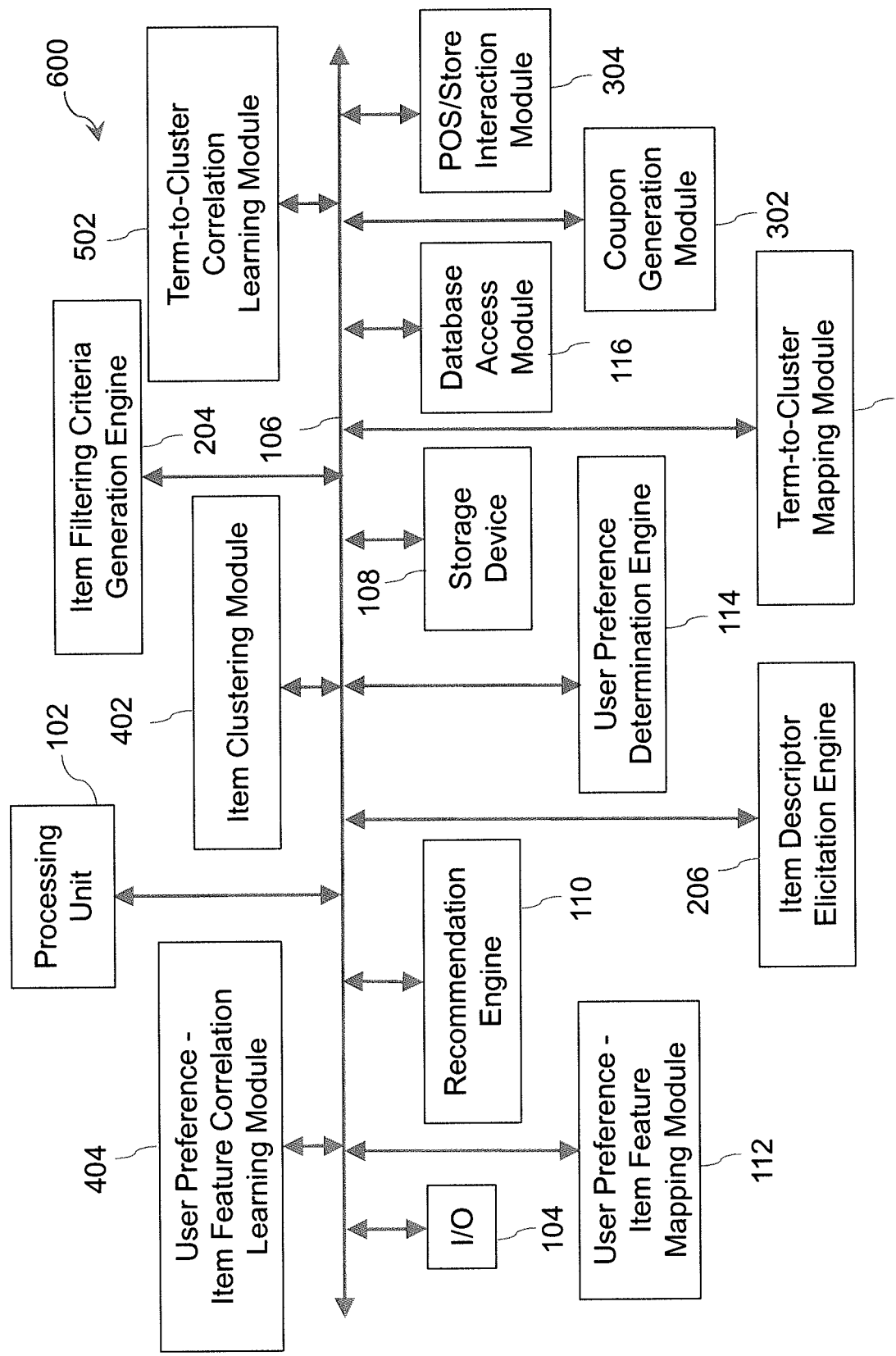
FIG. 6 is a schematic diagram of a sixth recommendation system in another embodiment of the present invention.

Referring next to FIG. 6, a schematic diagram of a fourth recommendation system 600 in another embodiment of the present invention is shown. Shown are the processing unit 102, the input/output module 104, the system bus 106, the storage device 108, the recommendation engine 110, the user preference-item feature mapping module 112, the user preference determination engine 114, the database access module 116, the term-to-cluster mapping module 202, the item filtering criteria generation engine 204, the item descriptor elicitation engine 206, the coupon generation module 302, the POS/store interaction module 304, the item clustering module 402, the user preference-item feature correlation learning module 404, and the term-to-cluster correlation learning module 502.

The processing unit 102, the input/output module 104, the system bus 106, the storage device 108, the recommendation engine 110, the user preference-item feature mapping module 112, the user preference determination engine 114, the database access module 116, the term-to-cluster mapping module 202, the item filtering criteria generation engine 204, the item descriptor elicitation engine 206, the coupon generation module 302, the POS/store interaction module 304, the item clustering module 402, the user preference-item feature correlation learning module 404, and the term-to-cluster correlation learning module 502 are as previously described in FIGS. 1-5.

The fourth recommendation system 600 includes components from the previously described recommendation/learning systems 100, 200, 300, 400 and 500. The fourth recommendation system 600 includes both learning modules/engines and recommendation modules/engines, such that the single fourth recommendation system 600 is configured to carry out both the mapping functions of the learning systems 400, 500 and the recommendation functions of the recommendation systems 100, 200, 300.

Figure 7:
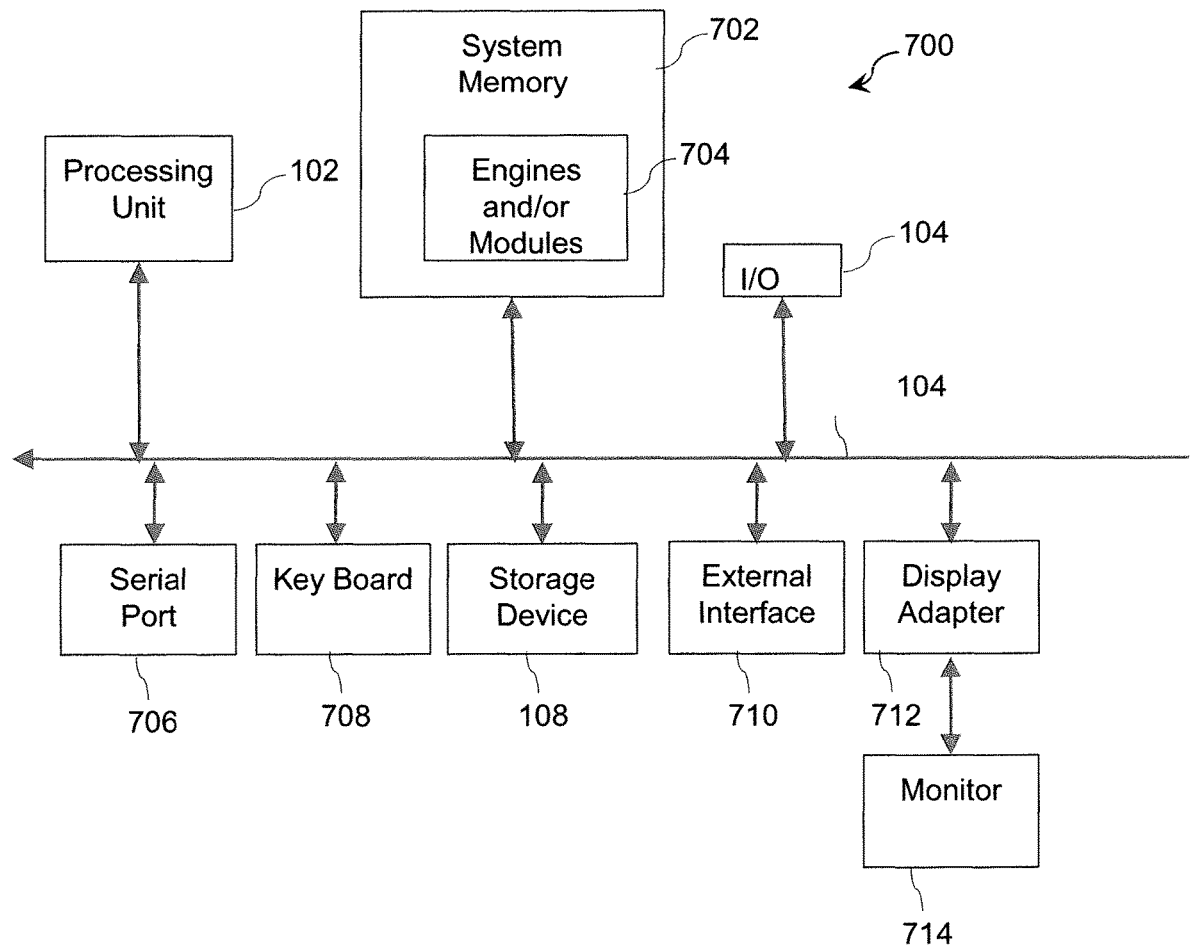
FIG. 7 is a schematic diagram of an exemplary computer system for use with one or more of the recommendation systems.

Referring next to FIG. 7, an exemplary computer system 700 for use with one or more of the recommendation systems 100, 200, 300, 400, 500, 600 is shown. Shown are the processing unit 102, the input/output module 104, the system bus 106, the storage device 108, a system memory 702, at least one engine/module 704, a serial port 706, a keyboard 708, an external interface 710, a display adapter 712, and a monitor 714.

The processing unit 102, the input/output module 104, and the storage device 108 are all coupled to the system bus 106 as previously described.

The system memory 702 comprises non-transitory memory and stores the at least one engine/module 704. The at least one engine module may include any of the previously described engines and/or modules (for example, the recommendation engine 110). The previously described engines and modules may be included in any functional combination and are not limited to the configurations shown in FIGS. 1-6. The engines and modules are run via the processing unit 102 as required.

The serial port 706 is coupled to the system bus 106 and provides an interface for connecting to an additional computing device. The keyboard 708 is coupled to the system bus and configured to provide user entry such as responses to user preferences. The keyboard 708 may also include other types of user entry such as a mouse.

The external interface 710 is coupled to the system bus and connects other devices to the system 100, 200, 300, 400, 500, 600. In some embodiments the external interface 710 is a USB port. The system 100, 200, 300, 400, 500, 600 may include a plurality of external interfaces 710.

The optional display adapter 712 is coupled to the system bus 106 and receives display input from at least one of the engines/modules 704 and sends it to an optional monitor 714. The monitor 714 is coupled to the display adapter 712 displays the display input received from the display adapter 712. In other embodiments the display is presented by a separate device such as the kiosk 808, and the display adapter 712 and the monitor 714 are not required.

Referring next to FIG. 8, a first exemplary network recommendation system 800 is shown. Shown are a server 802, a database 804, a mobile phone 806, a store kiosk 808, a laptop computer 810, a tablet 812, a desktop computer 814, a first network 816 and a second network 818.

The server 802 and the database 804 are each communicatively coupled to the first network 816, and are thus communicatively coupled to each other. In some embodiments, the database 804 is located within the server 802. The first network 816 is communicatively coupled to the second network 818. The plurality of client computing devices: the mobile phone 806, the store kiosk 808, the laptop computer 810, the tablet 812, and the desktop computer 814 are all communicatively coupled to the second network 818. It will be understood that the computing devices coupled to the second network 818 are intended to be representative of the various types of computing devices that may be coupled to the second network 818 to obtain recommendations, and not all of the devices will necessarily be coupled to the network.

The computing devices 806, 808, 810, 812, 814 may be coupled to the network via a physical connection or wirelessly. Similarly, the connections to the first network 816 may be physical or wireless.

The server 802 houses one or more of the recommendation/learning systems 100, 200, 300, 400, 500 and 600 and receives requests and other input from the client computing devices 806, 808, 810, 812, 814. Each computing device 806, 808, 810, 812, 814 is configured to communication with the server 802, present information from the server 802 to the user, receive user input, and send the user input back to the server 802. The database 804 includes at least one item database. In a typical embodiment, database management software is installed on the database 804 and the database 804 includes processing hardware configured to run the database management software. Each item database includes at least one data file. Examples of data files included in the database 804 are shown below in FIGS. 10 and 11. In some embodiments the database 804 is included in the system 100, 200, 300, 400, 500 and 600 instead of the separate database 804 shown in FIG. 8. The database 804 is generally accessed by the system 100, 200, 300, 400, 500 and 600 via the database access module 116.

In one example of the operation of the first exemplary network recommendation system 800, the user uses store kiosk 808 with the purpose to receive recommendations for an item such as wine. The kiosk 808 communicates with the server 802 via the networks 816, 818 to send user input to the server 802 and receive data from the server 802. In one example, the user inputs into the kiosk 808 an indication to initiate a recommendation session. The initiation indication is sent to the server 802. The server 802 then sends to the kiosk 808 instructions for presenting a series of questions to the user, for example on the user's food and drink preferences. The user enters responses to the questions and the kiosk 808 sends an indication of each response back to the server 802. The server 802 may also send to the kiosk 808 instructions for presenting contextual/filtering questions to the user, such as occasion, price range, and color of wine. The user enters responses to the contextual/filtering questions and the kiosk 808 sends an indication of each contextual/filtering response back to the server 802.

The server 802 uses the indications received in response to the user questions to analytically match the user preferences indicated by the responses to the questions to one or more items for which information is stored in the database 804. The server 802 then sends the item or items matched to the kiosk 808, whereby the kiosk 808 displays the matched item or items to the user.

The server 802 accesses the data stored in the database 804 to generate the questions and send the recommendations to the kiosk 808. The data stored in the database is described further below in FIGS. 10 and 11. While the communication described in the example is between the server 802 and the kiosk 808, it will be understood that the server 802 may communicate with any of the client computing devices 806, 808, 810, 812, 814. Additionally, any of the client computing devices 806. 808, 810, 812, 814 can function as a client for a retail store manager's console system. The retail store manager's console system may be installed on the server 802 and send information such as operation and usage of the recommendation system. For example, information sent by the retail store manager's console system can include a number of users who used the system over a period of time, and/or statistics on user preferences and items recommended during a period of time. In another embodiment, instead of the interactive store manager's console system the server 802 generates a store usage/sales report and sends the report to the store manager.

Figure 9:
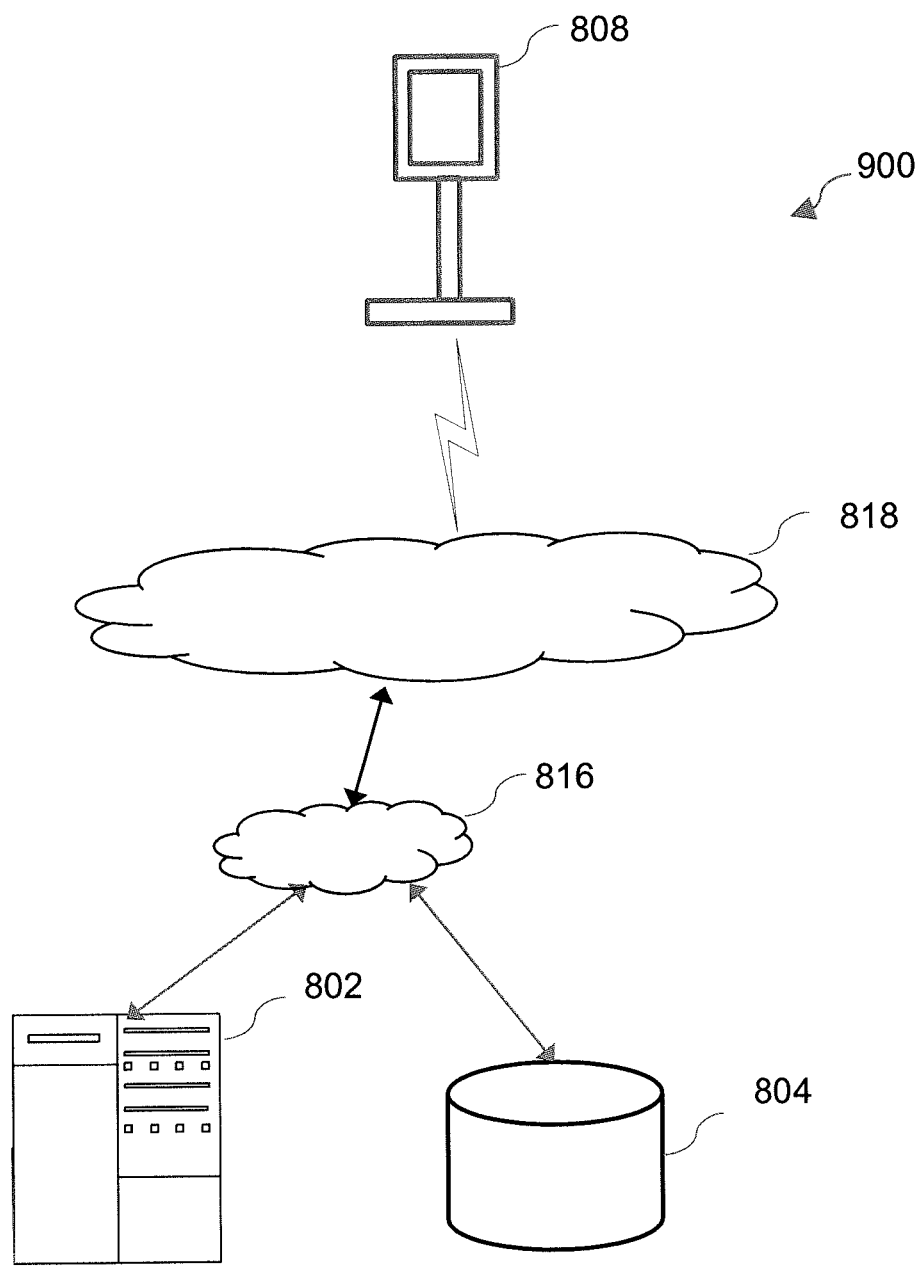
FIG. 9 is a schematic diagram of a second exemplary network recommendation system.

Referring next to FIG. 9, a second exemplary network recommendation system 900 is shown. Shown are the server 802, the database 804, the store kiosk 808, the first network 816 and the second network 818.

In the simplified exemplary second network recommendation system 900, the store kiosk 808 is communicatively coupled to the server 802 and the database 804 as previously described.

In the second exemplary network recommendation system 900, in lieu of the plurality of computing devices available as shown in FIG. 8, the interaction with the user is provided solely through one or more store kiosks 808 located in a store. The second network recommendation system 900 receives power from a power source located at the store. The second network recommendation system 900 is connected to a wireless network of the store. Each kiosk 808 is linked to inventory of the store in which it is located.

Figure 10:
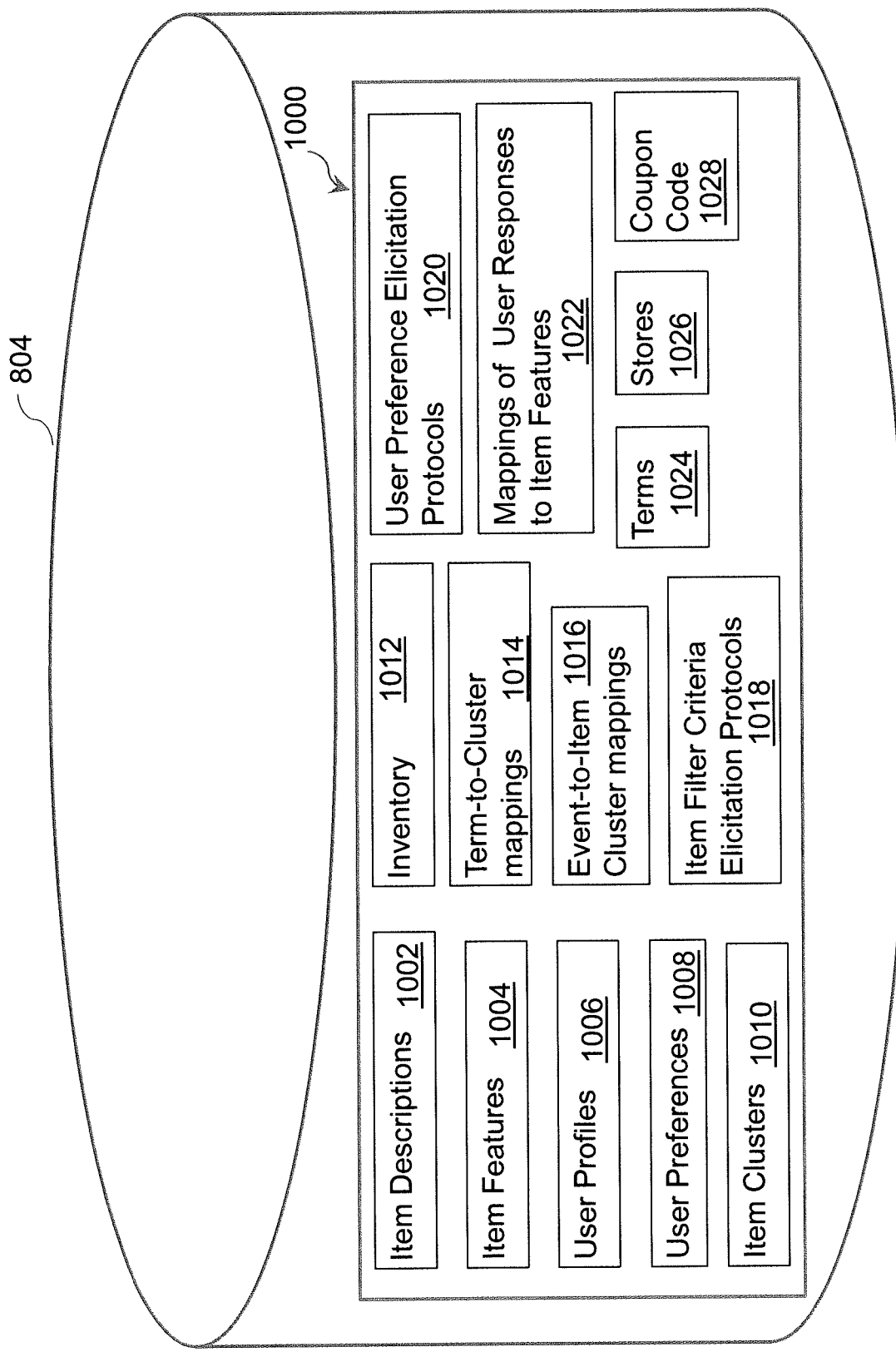
FIG. 10 is a first item database for a recommendation system.

Referring next to FIG. 10, a first item database 1000 in a first embodiment of an exemplary recommendation system is shown. Shown are the database 804, the first item database 1000, an item descriptions data file 1002, an item features data file 1004, a user profiles data file 1006, a user preferences data file 1008, an item clusters data file 1010, an inventory data file 1012, a term-to-cluster mappings data file 1014, an event-to-cluster mappings data file 1016, an item filter criteria elicitation protocols data file 1018, a user preference elicitation protocols data file 1020, a mappings of user features to item features data file 1022, a terms data file 1024, a stores data file 1026, and a coupon code data file 1028.

The exemplary first item database 1000 stored on the database 804 includes the item descriptions data file 1002, which includes information associated with each of the plurality of items. Information can include price, manufacturer, name, etc. Each item in the first item database 1000 is associated with a unique item identification term, such as an id number.

The item features data file 1004 includes item features for the plurality of items. As previously described, item features are item variables such as chemical compounds, associated terms, price, color, etc. The user profile data file 1006 includes data associated with each unique user (with each user having a unique user identification term, such as a number). The user data for each user can include such information as email address, gender, and birth date.

The user preferences data file 1008 includes data associated with each user regarding item preferences of that user. For example, for a first user the user preference data associated with the first user includes residual sugar=5, total acidity=5, and Oak=5, referring to the first user's preference for items matching those values of residual sugar, total acidity, and Oak.

The item clusters data file 1010 stores the association of each item with one cluster. Each cluster is identified by a unique cluster identification term.

The inventory data file 1012 includes an inventory of the items, including the types and quantities of items available for purchase.

The term-to-cluster mappings data file 1014 includes associations between terms/descriptors and items. In one embodiment, the term-to-cluster mappings data file 1014 is a table with terms as column headers and cluster identifications as row headers. A value of "1" in a table cell indicates an association of the term/descriptor with the cluster, and a value of "0" in a table cell indicates no association between the term/descriptor and the cluster. An exemplary term-to-cluster mapping table 1500 is shown in FIG. 15. In another example the term-to-cluster mappings may be expressed by vectors, such as Cluster 1=[Fruity, Refreshing] indicating that Cluster #1 is associated with the terms Fruity and Refreshing. In another vector example, all terms may be listed with the term "1" indicating associating the cluster with the term: Cluster #1=[Fruity=1, Oaky=0. Refreshing=1] indicates the cluster is associated with "fruity" and "refreshing" but not with "oaky".

Figure 24:
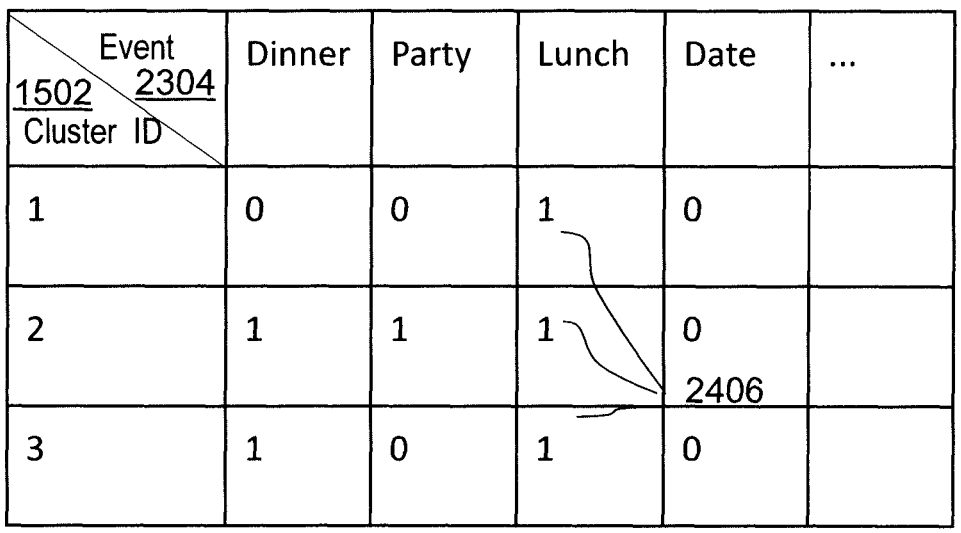
FIG. 24 is an event-to-cluster mapping table.

The event-to-cluster mappings data file 1016 includes associations between each cluster and a plurality of events such as "dinner" or "wedding". In one embodiment, the event-to-cluster mappings data file 1016 is a table with events as column headers and cluster identification terms as row headers. A value of "1" in a table cell indicates an association of the cluster with the event, and a value of "0" in a table cell indicates no association between the cluster and the event. An exemplary event-to-cluster mapping table 2400 is shown in FIG. 24.

The item filter criteria elicitation protocols data file 1018 stores context/filtering protocols that are used to elicit filtering criteria from the user. For example, one protocol could include questions regarding price range and context for which the user wants to buy the item (such as a type of occasion).

The user preference elicitation protocols data file 1020 stores information on user preference protocols. For example, in one embodiment the user preference elicitation protocols data file 1020 includes at least one user preference protocol for presenting a series of questions to the user for which responses elicit user preferences with respect to the items. An example of a question included in the user preference protocol is a feature-based question 1802 presented in FIG. 18.

The mappings of user responses to item features data file 1022 includes associations between user responses to the user preference protocol and item features. For example, in one embodiment the mappings of user responses to item features data file 1022 includes associations between the user responses to questions regarding food and drink to specific chemistry-based features. Each response to a question is mapped to a value of a specific feature or features. For example, in the question asked in FIG. 18, "How do you like your tea or coffee?", the response "black" is mapped to the item feature of a low residual sugar value. An example of a chemistry feature-to-response mapping table 1900 is shown in FIG. 19.

Figure 30:
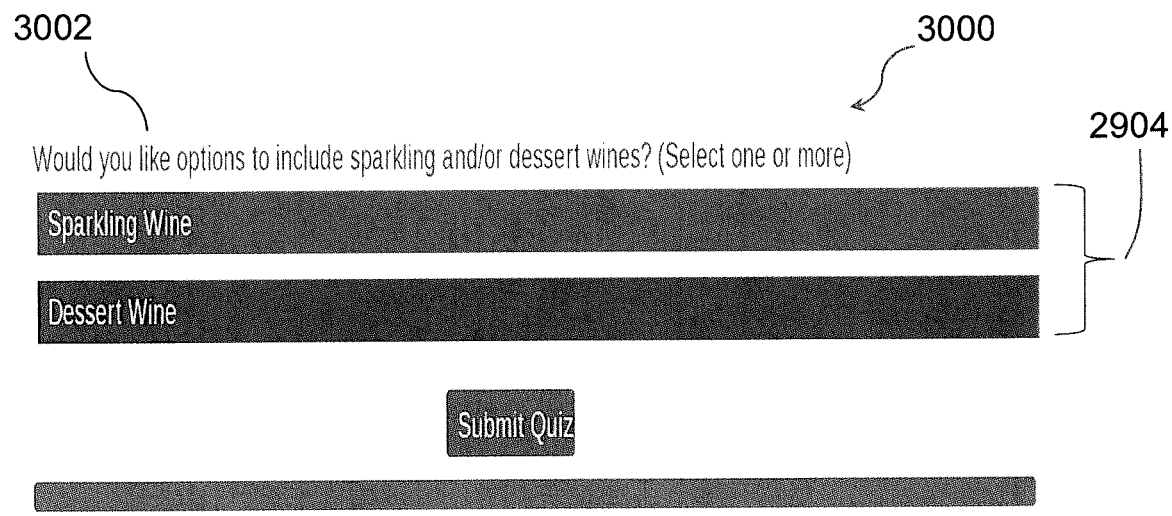
FIG. 30 is an illustration of a fourth context-based user interface for a fourth context-based question.

The terms data file 1024 includes a list of the terms/descriptors used to associate with items or item clusters. Examples of terms are shown in FIG. 30.

The stores data file 1026 includes information about stores such as store identification terms, store locations, store names, and store inventories.

The coupon code data file 1028 stores coupon codes and data regarding their association with items and stores. For example, a first coupon code is associated with a first item and a first store, and the coupon code data file 1028 includes an indication that the first coupon code can only be applied towards the first item when purchased at the first store.

Figure 11:
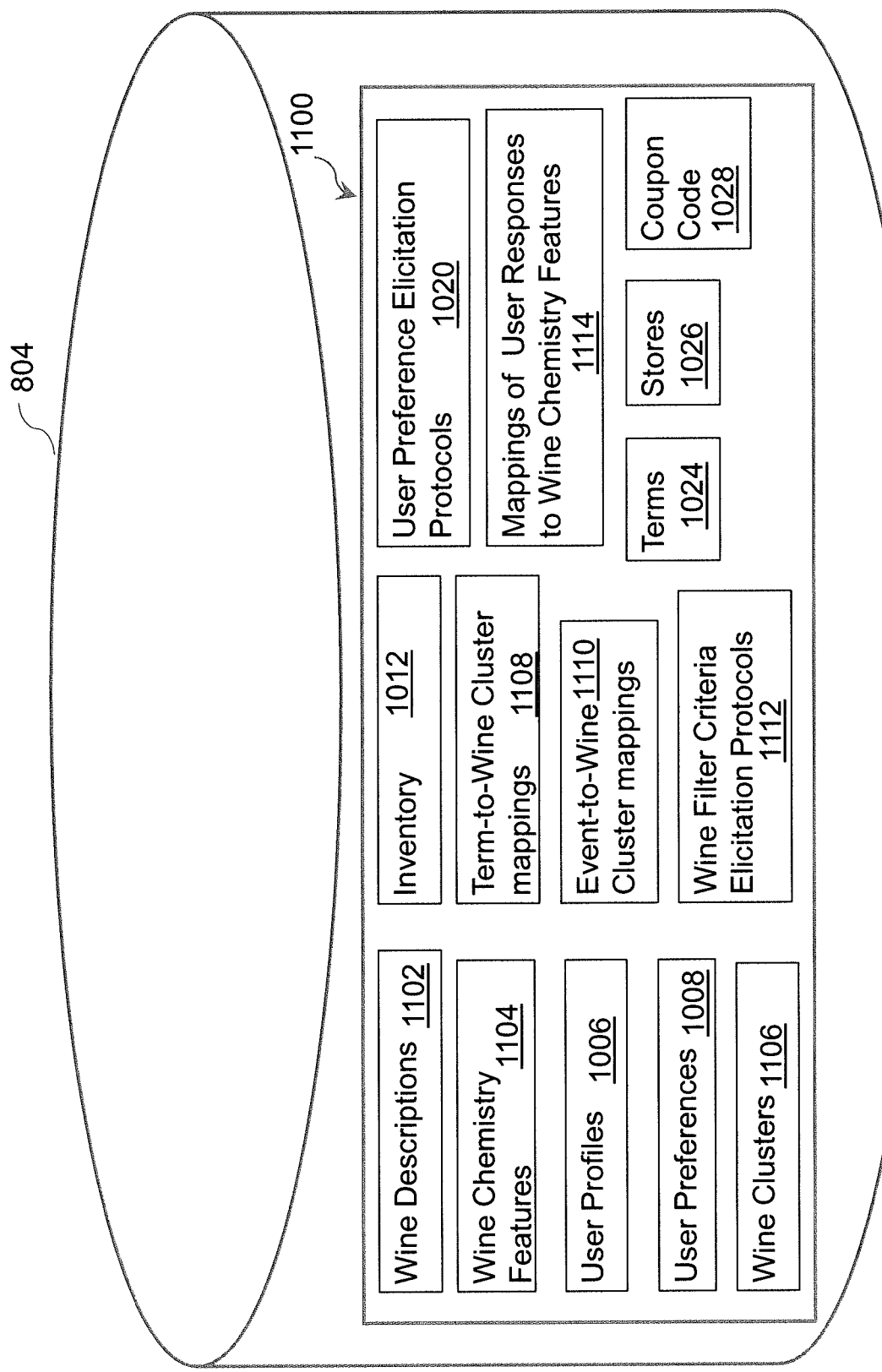
FIG. 11 is a second item database for a recommendation system.

Referring next to FIG. 11, a second item database 1100 in a second embodiment of an exemplary recommendation system is shown. Shown are the database 804, the second item database 1100, a wine descriptions data file 1102, a wine chemistry features data file 1104, the user profiles data file 1006, the user preferences data file 1008, a wine clusters data file 1106, the inventory data file 1012, a term-to-wine cluster mappings data file 1108, the event-to-wine cluster mappings data file 1110, a wine filter criteria elicitation protocols data file 1112, the user preference elicitation protocols data file 1020, a mappings of user features to wine chemistry features data file 1114, the terms data file 1024, the stores data file 1026, and the coupon code data file 1028.

The second item database 1100 is structured similarly to the first database, with analogous data files. Instead of general item references, the second database 1100 has been configured specifically for wines as the item. Each wine is associated with a unique wine identification term.

The wine descriptions data file 1102 associates each wine with information for that wine, such as name, vintage, appellation, winery, price and tasting notes.

The wine chemistry features data file 1104 includes chemistry-based features for wines. The chemistry-based features may be specific volatile compounds found in wine or quantifiable chemical properties such as percent of residual sugar or percent alcohol.

The user profiles data file 1006, the user preferences data file 1008, the stores data file 1026, and the coupon code data file 1028 are as previously described in FIG. 10.

The wine clusters data file 1106 stores the association of each wine with one cluster of wines. Each cluster is identified by a unique cluster identification term. The wine clusters are determined by sorting the wines according to pre-determined criteria, and grouping wines with similar values. The criteria in the typical embodiment is chemistry-based characteristics or properties such as total acidity and residual sugar.

The inventory data file 1012 records the inventory for each wine.

The term-to-wine cluster mappings data file 1108 includes associations between terms and wines, as previously described in FIG. 10. The exemplary term-to-cluster mapping table 1500 for wine clusters is shown below in FIG. 15.

The event-to-wine cluster mappings data file 1110 includes associations between each wine cluster and the plurality of events such as "dinner" or "wedding". In one embodiment, the event-to-wine cluster mappings data file 1110 includes tables with events as column headers and cluster identification terms as row headers. A value of "1" in a table cell indicates an association of the cluster with the event, and a value of "0" in a table cell indicates no association between the cluster and the event. The exemplary event-to-wine cluster mapping table 2400 is shown in FIG. 24.

The wine filter criteria elicitation protocols data file 1112 stores protocols to elicit filtering criteria for the wines. For example, wine filter criteria protocols include question such as wine price range and the context for which the user wants to buy the wine.

The user preference elicitation protocols data file 1020 stores information on user preference protocols for determining user preferences with regards to wine. For example, an exemplary user preference protocol uses a question regarding how the user prefers to take his coffee to aid in determining the user's wine preference.

The mappings of user responses to wine chemistry features data file 1114 includes associations between user responses to a user preference protocol and wine chemistry-based features. The mappings of user responses to wine chemistry features data file 1114 in one embodiment includes associations of each possible user response to a user preference protocol with a specific wine chemistry-based feature value. For example, in the feature-based question 1802 asked in FIG. 18, "How do you like your tea or coffee?", the response "black" is mapped to the chemistry-based feature of a wine low residual sugar value. An example of the exemplary chemistry feature-to-response mapping table 1900 is shown in FIG. 19.

The terms data file 1024 is a list of the terms/descriptors used to associate with wines or wine clusters. An exemplary term selection user interface 3100 showing wine terms/descriptors is shown in FIG. 31. A flavor descriptor chart 3600 including additional flavor descriptors 2104 are shown below in FIGS. 21 and 36.

Figure 12:
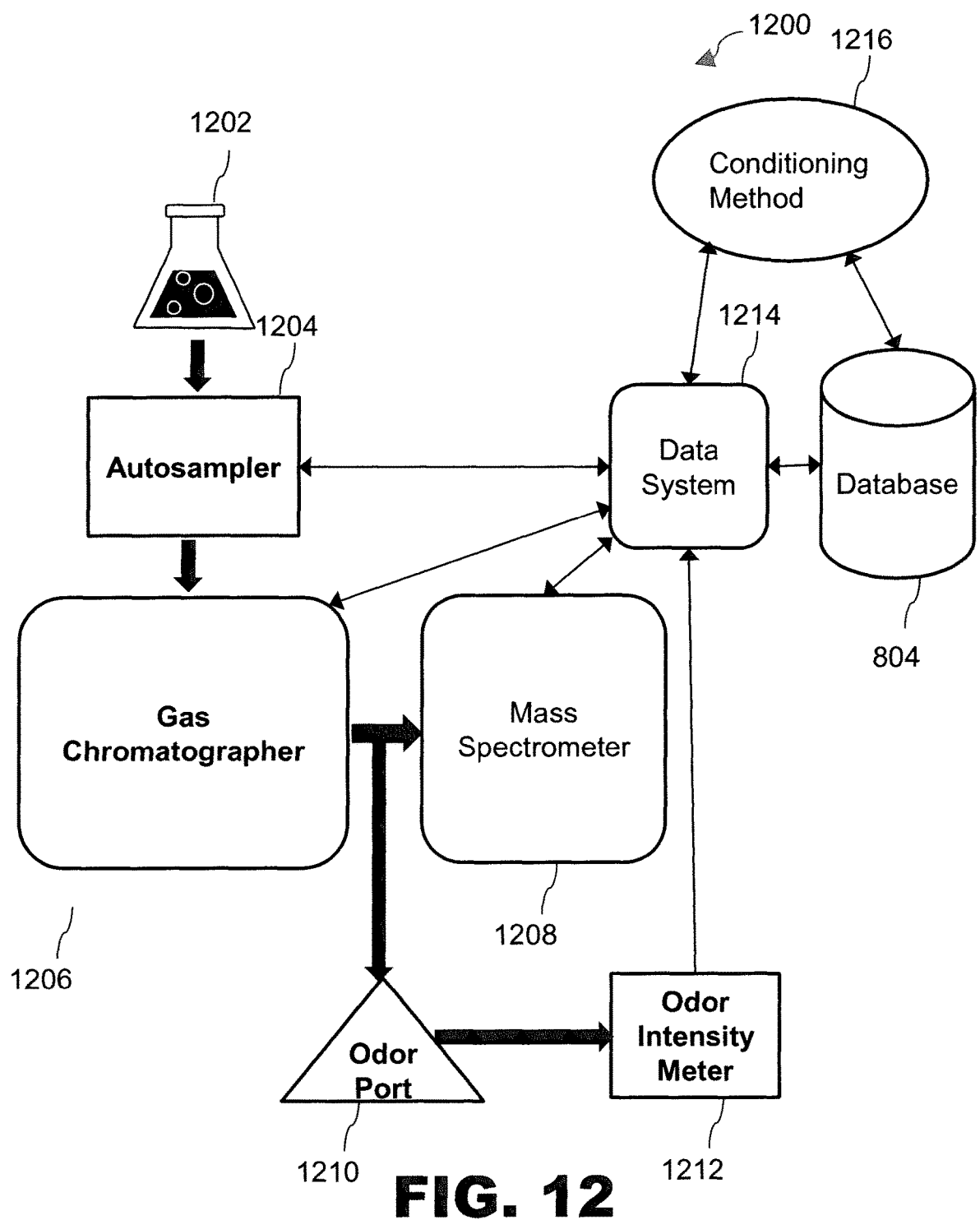
FIG. 12 is an exemplary item analysis system.

Referring next to FIG. 12, an exemplary item analysis system 1200 for determining item chemistry features for use in the exemplary network recommendation systems 800, 900 is shown. Shown are an item sample 1202, an autosampler 1204, a gas chromatographer 1206, a mass spectrometer 1208, an odor port 1210, an odor intensity meter 1212, a data system 1214, a conditioning method 1216, and the database 804.

The autosampler 1204 receives at least one item sample 1202. In some embodiments the autosampler 1204 receives multiple separate items to be analyzed. In other embodiments the autosampler 1204 is not used and the item sample 1202 is placed directly in the gas chromatographer 1206. The gas chromatographer 1206 receives the item sample 1202 and separates the item into its constituent chemical compounds. The chemical compounds are sent to the mass spectrometer 1208, which identifies and measures the chemical compounds and other chemical properties of the item.

The odor port 1210 is a port used to access the chemical compounds in order to confirm or identify a particular sensory characteristic associated with a measurable chemical compound. The odor intensity meter 1212 determines the value of the sensory characteristic and sends the sensory characteristic value to the data system 1214. In the present embodiment, the odor intensity meter 1212 is an operating chemist.

The data system 1214 receives data regarding the item from the autosampler 1204 (if present in the item analysis system 1200), the gas chromatographer 1206, and the mass spectrometer 1208.

The optional conditioning method 1216 is an application running on a computing device that receives item data from the data system 1214 and is used to recalculate perceived sensory experience based on concentration of other variables. For example, the conditioning method 1216 can include reducing the value of total acidity of the item by 1 if the percent of alcohol of the item is greater than 15.5. The conditioning method 1216 can also receive item data from the database 804.

The item data received by the data system 1214 are scaled and translated by the data system 1214. The data system 1214 then sends the data required by the first exemplary network recommendation system 800 to the database 804. Data obtained includes all identifiable chemical compounds, the quantity of the identified compounds, and other relevant chemistry-based features.

It will be understood by those of ordinary skill in the art that any chemical analysis equipment and/or method for acquiring the necessary chemical data for an item may be used in lieu of the system disclosed in FIG. 12.

Figure 13:
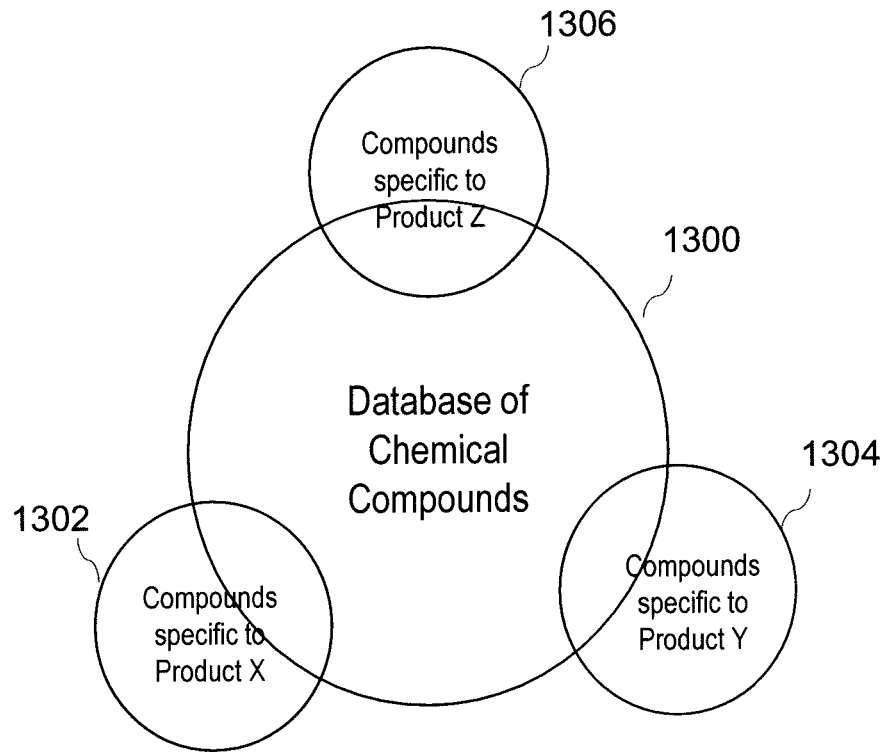
FIG. 13 is a diagram of grouping of chemical compounds.

Referring next to FIG. 13, an exemplary grouping of chemical compounds is shown. Shown are a database of chemical compounds 1300, a group of product X compounds 1302, a group of product Y compound 1304, and a group of product Z compounds 1306.

As illustrated in FIG. 13, chemical compounds may be used to sort and identify different products or items. The chemical compounds database 1300 includes identities of chemical compounds that can be identified in an item or product. The database of chemical compounds 1300 may be general or limited to a specific type of item, such as an alcoholic beverage or more specifically to wine.

The group of product X chemical compounds 1302 are the chemical compounds comprising the item product X. Some of the product X chemical compounds 1302 are included in the database of chemical compounds 1300, as shown in the overlap of the group of product X compounds 1302 and the database of chemical compounds 1300. Similarly, some of the group of product Y compounds 1304 and some of the group of product Z compounds 1306 are included in the database of chemical compounds 1306. As shown in FIG. 13, the group of product X compounds 1302, the group of product Y compounds 1304, and the group of product Z compounds 1306 do not overlap. This means that each product can be identified and sorted based solely on their chemical compounds that are included in the database of chemical compounds 1300.

While in the example shown in FIG. 13 the groups of chemical compounds 1302, 1304, and 1306 are shown with no overlap, it will be understood that in other instances products or items may share chemical compounds.

Referring next to FIG. 14, an exemplary term-to-item mapping table 1400 is shown. Shown are a plurality of item identifications 1402, a plurality of terms 1404, and a plurality of term-item values 1406.

The term-to-item mapping table 1400 includes a plurality of rows with each row associated with one item identification 1402. Each column is associated with one term 1404 (also referred to as descriptors). In the exemplary table 1400 the terms 1404 are "Zesty", "Soft", "Flat", "Heavy", Young", "Mature", "Crisp", and "Casual".

The term-item value 1406 for each cell indicates whether the term is associated with the item. In the exemplary table 1400, a "1" value indicates an association, and a "0" value indicates no association. As shown in FIG. 14, item 1 has no association with the terms "Zesty", "Soft", or "Heavy", but is associated with "Casual". Flat", "Young", "Mature", and "Crisp", The term-item values 1406 are determined by the term-to-cluster correlation learning module 502 as described above in FIG. 5.

Referring next to FIG. 15, an exemplary term-to-cluster mapping table 1500 is shown. Shown are a plurality of cluster identifications 1502, the plurality of terms 1404, and a plurality of term-cluster values 1506.

The term-to-cluster mapping table 1500 is similar to the term-to-item mapping table 1400, with the difference that instead of the plurality of item identifications 1402, the term-to-cluster mapping table 1500 includes the plurality of cluster identifications 1502. Each cluster identification refers to a group of items as previously described. The term-cluster values 1506 identify which terms are associated with each cluster. As shown in FIG. 15, cluster 1 has no association with the terms "Zesty", "Soft", or "Heavy", but is associated with "Casual". Flat", "Young", "Mature", and "Crisp", Referring next to FIG. 16, a flowchart for creating a unit of inquiry (also referred to as a UOI) is shown. Shown are a create UOI step 1600, a create UOI responses step 1602, a select unselected UOI response step 1604, an associate item feature step 1606, a determine influence step 1608, an unselected response decision point 1610, and a complete UOI step 1612.

As previously described, the database 804 includes the user preference elicitation protocols data file 1020 including user preference protocols that are used to determine user preference. Each user preference protocol included in the user preference elicitation protocols data file 1020 includes at least one unit of inquiry. Each unit of inquiry is defined as a unit of query that is used to extract information from a human or other system or unstructured or structured data. In one embodiment, one unit of inquiry is a multiple choice question. In another embodiment one unit of inquiry is one or more SQL statements that act on a database and return data regarding user preference (for example, data including a user's social media history or a user's purchase history). The user preference determination engine 114 is configured to create the unit of inquiry as described in FIG. 16.

In the first create UOI step 1600, the user preference determination engine 114 creates a new unit of inquiry, for example a first question. In the next create UOI responses step 1602, possible responses to the UOI are determined. In one embodiment, the possible responses are determined by a person (such as multiple choice answers to a question). In another embodiment, possible responses may be price ranges or ingredients of an item.

In the next select unselected UOI response step 1604, a previously unselected response is selected from the list of possible responses to the UOI. The process proceeds to the associate item feature step 1606.

During the associate item feature step 1606, at least one term, chemistry-based feature, or item attribute is associated with the response. Terms, chemistry-based features, and attributes may include a price, a manufacturer, a color, an ingredient, a chemical compound, a chemical property, a weight, a user review rating, or any other attribute or property that may be associated with an item.

In the determine influence step 1608, for each term, chemistry feature, and/or attribute associated with the response, a corresponding value (or change in value) of a user preference value is determined for the selected response and associated with the response. For example, if the response is associated with the chemistry-based feature of total acidity, the value of the total acidity user preference can be incremented by 1. In another example, the response is associated with percent alcohol, and a value of the user preference for alcohol is divided by two. The process then proceeds to the unselected response decision point 1610.

During the unselected response decision point 1610, if there are remaining unselected responses (i.e. not all responses have been assigned terms, etc. and values) the process returns to the select unselected UOI response step 1604, and a different response is chosen and the process repeats.

If all responses have been selected and have been assigned terms, etc. and values, the process proceeds to the complete UOI step 1612. In the complete UOI step 1612, the completed UOI including the UOI, all UOI responses, terms, etc. associated with each response, and values associated with each response are saved to the user preference elicitation protocols data file 1020. Additionally, association of each specific response to a term/feature and the quantitative influence is stored in the mappings of possible user responses to item features data file 1022.

Figure 17:
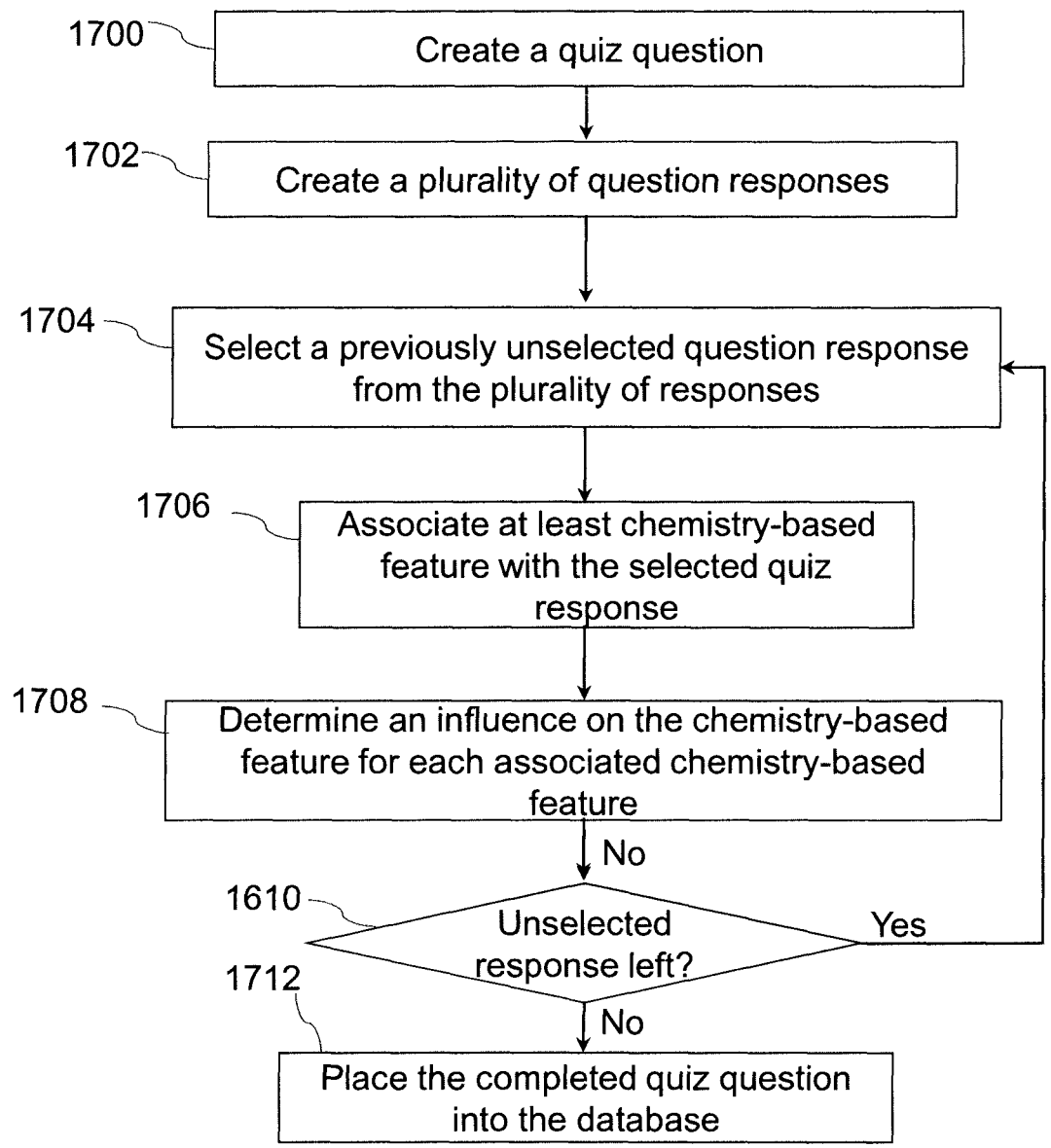
FIG. 17 is a flowchart for creating a chemistry-based quiz question type of unit of inquiry.

Referring next to FIG. 17, a flowchart for creating a chemistry-based quiz question type of unit of inquiry (UOI) is shown. Shown are a create question step 1700, a create question responses step 1702, a select unselected question response step 1704, an associate chemistry-based item feature step 1706, a determine chemistry-based influence step 1608, an unselected response decision point 1610, and a complete question step 1712.

Figure 16:
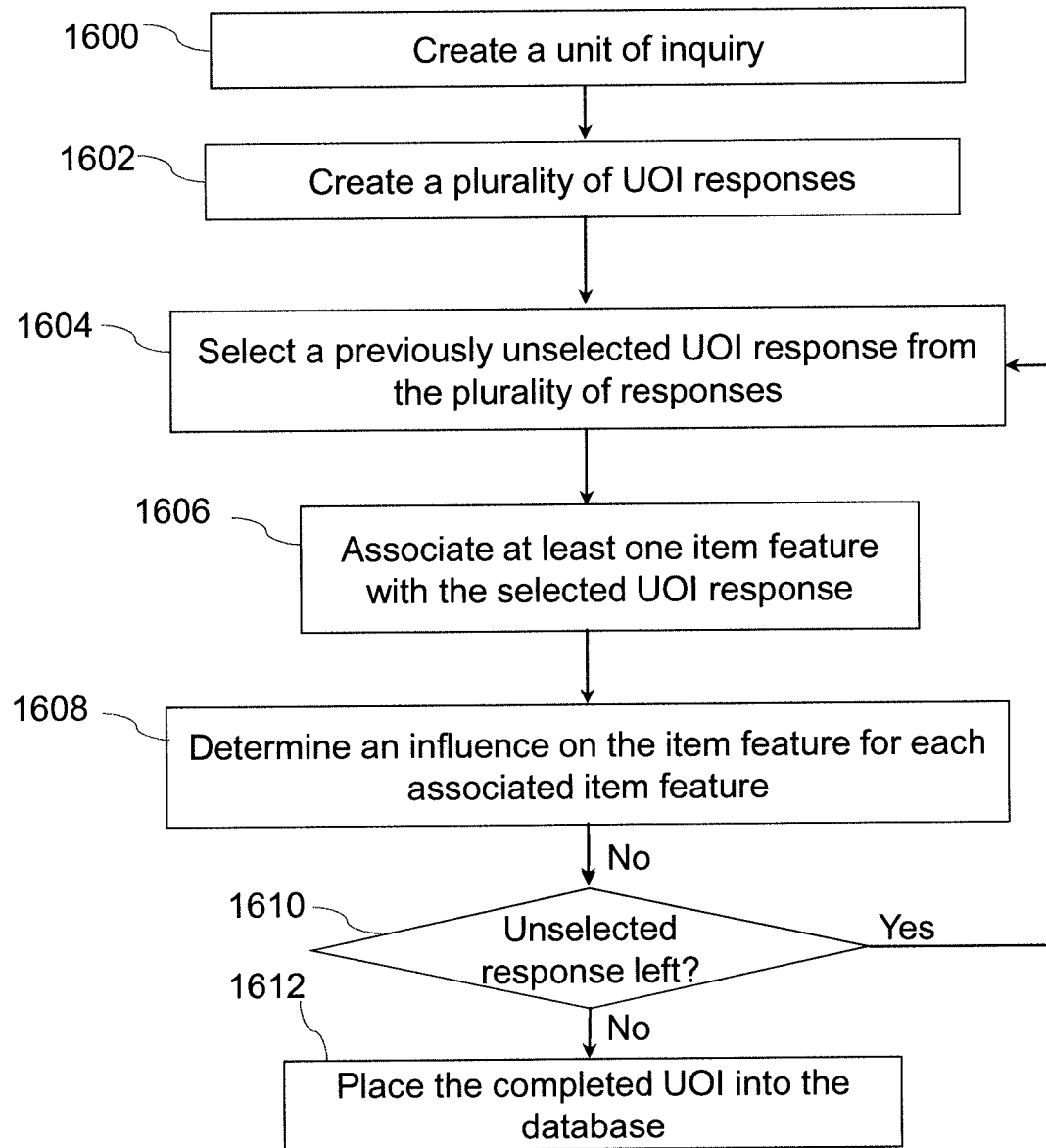
FIG. 16 is a flowchart for creating a unit of inquiry.

The flowchart for creating the chemistry-based quiz question type of unit of inquiry (UOI) is a type of the general UOI flowchart shown in FIG. 16. The flowchart specifies that the UOI is quiz question and the features are chemistry-based, i.e. are related to chemical properties and/or components of the item.

In the first create question step 1700, the user preference determination engine 114 creates a new question, for example a first quiz question. In the next create question responses step 1702, possible responses to the quiz question are determined.

In the next select unselected question response step 1704, a previously unselected response is selected from the list of possible responses to the question. The process proceeds to the associate chemistry-based item feature step 1706.

During the associate chemistry-based item feature step 1706, at least one chemistry-based feature 1904 is associated with the response. Chemistry-based features can include a chemical compound, a chemical property, or any other chemical-based attribute that may be associated with an item. Examples of chemistry-based features include alcohol content, total acidity, residual sugar level, and level of any volatile compound found in the item.

In the determine influence step 1708, for each chemistry-based feature associated with the response, a corresponding value of the chemistry-based feature is determined for the selected response and associated with the response. The process then proceeds to the unselected response decision point 1610.

During the unselected response decision point 1610, if there are remaining unselected responses (i.e. not all responses have been assigned terms etc. and values) the process returns to the select unselected question response step 1704, and a different response is chosen and the process repeats.

If all responses have been selected and have been assigned terms etc. and values, the process proceeds to the complete question step 1712. In the complete question step 1712, the completed question including the question, all question responses, terms etc. associated with each response, and values associated with each response are saved to the user preference elicitation protocols data file 1020. Additionally, association of each specific response to a chemistry-based feature and the quantitative influence is stored in the mappings of possible user responses to item features data file 1022.

Figure 18:
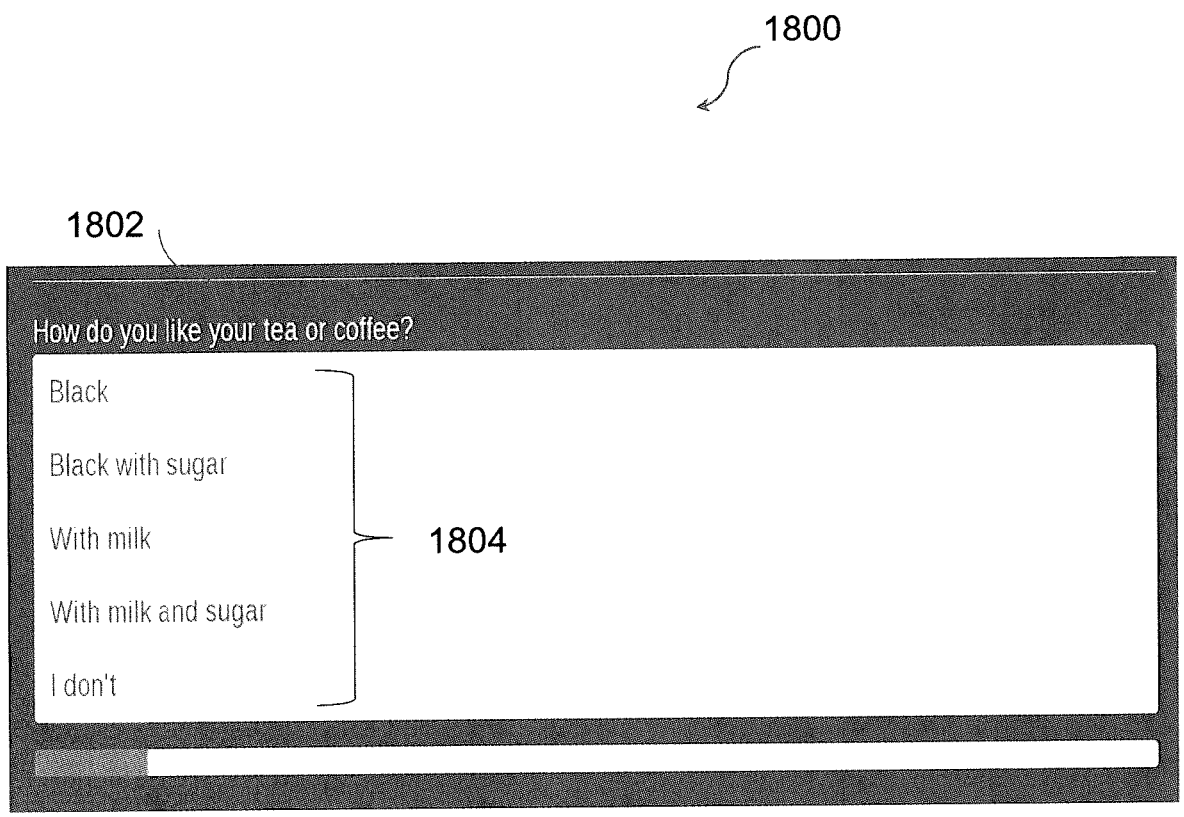
FIG. 18 is an illustration of a first user interface.

Referring next to FIG. 18, an example of a first user interface 1800 for the feature-based question 1802 is shown. Shown are the feature-based question 1802 and a plurality of feature-based question responses 1804.

Shown in FIG. 18 is an example of a feature-based user preference protocol question as presented to a user to provide input, for example via a touch-screen kiosk. The feature-based question 1802 is part of a user preference protocol developed using the process described in FIG. 16.

The exemplary feature-based question is "How do you like your tea or coffee?" The available response choices are "Black", Black with sugar", "with milk", "With milk and sugar", and "I don't". When the user selects one of the available responses, the user preference is updated based on the item feature influence previously associated with the response, as previously described in FIGS. 16 and 17. For example, the response "black" could be determined to decrease the user preference value of the item feature of residual sugar value.

Referring next to FIG. 19, the exemplary chemistry feature-to-response mapping table 1900 is shown. Shown are a plurality of response identifications 1902, a plurality of chemistry-based features 1904, and a plurality of feature-response values 1906.

The chemistry feature-to-response mapping table 1900 includes a plurality of rows with each row associated with one response identification 1902. Each column is associated with one chemistry-based feature 1904. In the exemplary table 1900 the chemistry-based features 1904 are "Alc." representing percent alcohol, "Oak" representing a degree of "oakiness" of the wine ("oakiness" may be defined using chemistry-based evaluation or by evaluation of the wine by a person), "TA" representing total acidity, "RS" representing percent residual sugar, "VS" representing viscosity, "ML" representing presence of chemical compounds associated with maloactic fermentation, and "TAN" representing amount of tannin.

The feature-response values 1906 for each cell indicates the increment that the corresponding user preference value is incremented or decremented based on the associated response for a specific unit of inquiry. In the exemplary table 1900, the feature-response values 1906 are shown as positive and negative numbers, indicating the amount that the corresponding user preference value is incremented or decremented. For example, if a user selects the first response, the Oak, ML and VS values for that user are incremented by one, the RS value is decremented by 1, and the Alc., Tan and TA values for that user are unchanged.

Referring next to FIG. 20, an exemplary chemistry feature-to-user mapping table 2000 is shown. Shown are a plurality of user identifications 2002, the plurality of chemistry-based features 1904, and a plurality of feature values 2006.

The chemistry feature-to-user mapping table 2000 includes a plurality of rows with each row associated with one user identification 2002. Each column is associated with one chemistry-based feature 1904. The chemistry-based features 1904 are the same as in the chemistry feature-to-response mapping table 1900.

The feature values 2006 for each cell indicate the degree of each user's preference for each chemistry feature. In the embodiment shown, the feature values 2006 are represented by numerical values with higher values indicating a higher user preference and lower values indicating lower user preference.

The feature values 2006 are determined by execution of one or more user preference protocols including at least one unit of inquiry. The choosing of responses by the user will change the value of feature values 2006 as determined by the chemistry feature-to-response mapping table 1900. For example, if a user selects the first response from the chemistry feature-to-response mapping table 1900, the Oak, ML and VS feature values 2006 for that user are incremented by one, the RS feature value 2006 is decremented by 1, and the Alc., Tan and TA feature values 2006 for that user are unchanged.

Referring next to FIG. 21, an exemplary flavor-to-user mapping table 2100 is shown. Shown are a plurality of user identifications 2002, a plurality of flavor descriptors 2104, and a plurality of flavor-user values 2106.

The flavor-to-user mapping table 2100 includes a plurality of rows with each row associated with one user identification 2002. Each column is associated with one flavor descriptor 2104. The exemplary flavor descriptors 2104 include "cranberry", "oak", "cherry", "vanilla", "earth", "blackberry", and "bell pepper".

The flavor-user values 2106 for each cell indicate the degree of each user's preference for each flavor. In the embodiment shown, the flavor-user values 2106 are represented by numerical values with higher values indicating a higher user preference and lower values indicating lower user preference.

The flavor-user values 2106 are determined by execution of one or more user preference protocols including at least one unit of inquiry. The choosing of responses by the user will change the value of flavor-user values 2106 as determined by a flavor-to-response mapping table similar to the chemistry feature-to-response mapping table 1900.

Figure 22:
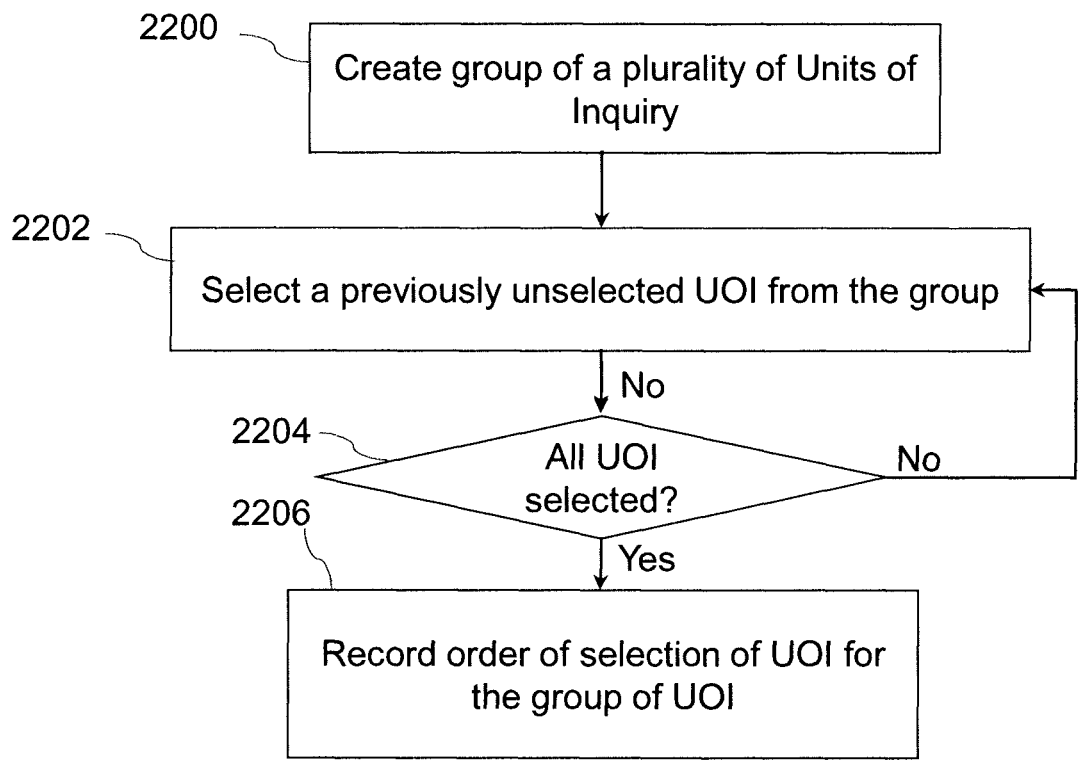
FIG. 22 is a user preference elicitation protocol flowchart.

Referring next to FIG. 22, a user preference elicitation protocol flowchart is shown. Shown are a create group step 2200, a select UOI step 2202, an all UOI selected decision point 2204, and a record order of selection step 2206.

In the first create group step 2200, a user preference protocol is created. In the next select UOI step 2202, one UOI is selected from a pool of previously stored individual units of interaction. For example, a quiz question is selected from the pool of quiz questions previously stored. In some embodiments, the units of inquiry are weighted, wherein the UOI is assigned a weight during the select UOI step 2202. The process then proceeds to the all UOI selected decision point 2204.

In the all UOI selected decision point 2204, if UOI remain unselected, the process returns to the select UOI step 2202, and a previously unselected UOI is added to the protocol.

If all UOI in the pool have been selected, the process advances to the record order of selection step 2206. In the record order of selection step 2206, the order of selection of the UOI, as well as the UOI, are stored and identified as a user preference elicitation protocol.

Figure 23:
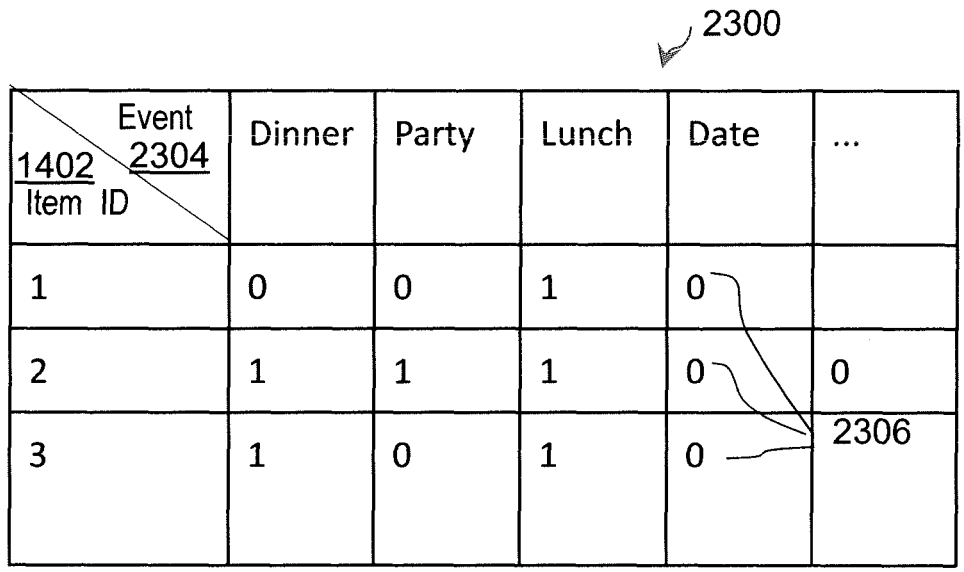
FIG. 23 is an event-to-item mapping table.

Referring next to FIG. 23, an exemplary event-to-item mapping table 2300 is shown. Shown are the plurality of item identifications 1402, a plurality of events 2304, and a plurality of event-item values 2306.

The event-to-item mapping table 2300 includes a plurality of rows with each row associated with one item identification 1402. Each column is associated with one event 2304. In the exemplary event-to-item mapping table 2300 the events 2304 are "Dinner", "Party", "Lunch", and "Date".

The event-item value 2306 for each cell indicates whether the item is associated with the event. In the exemplary event-to-item mapping table 2300, a "1" value indicates an association, and a "0" value indicates no association. As shown in FIG. 14, item 1 has no association with the events "dinner", "party" and "date", but is associated with the event "lunch".

The event-item values 2306 are determined by the term-to-cluster correlation learning module 502, or may be input manually.

Referring next to FIG. 24, the exemplary event-to-cluster mapping table 2400 is shown. Shown are a plurality of cluster identifications 1502, the plurality of events 2304, and a plurality of event-cluster values 2406.

The event-to-cluster mapping table 2400 is similar to the event-to-item mapping table 2300, with the difference that instead of the plurality of item identifications 1402, the event-to-cluster mapping table 2400 includes the plurality of cluster identifications 1502. Each cluster identification 1502 refers to a group of items as previously described. The event-cluster values 2406 identify which events are associated with each cluster. As shown in FIG. 24, cluster 1 has no association with the events "dinner", "party" and "date", but is associated with the event "lunch".

Figure 25:
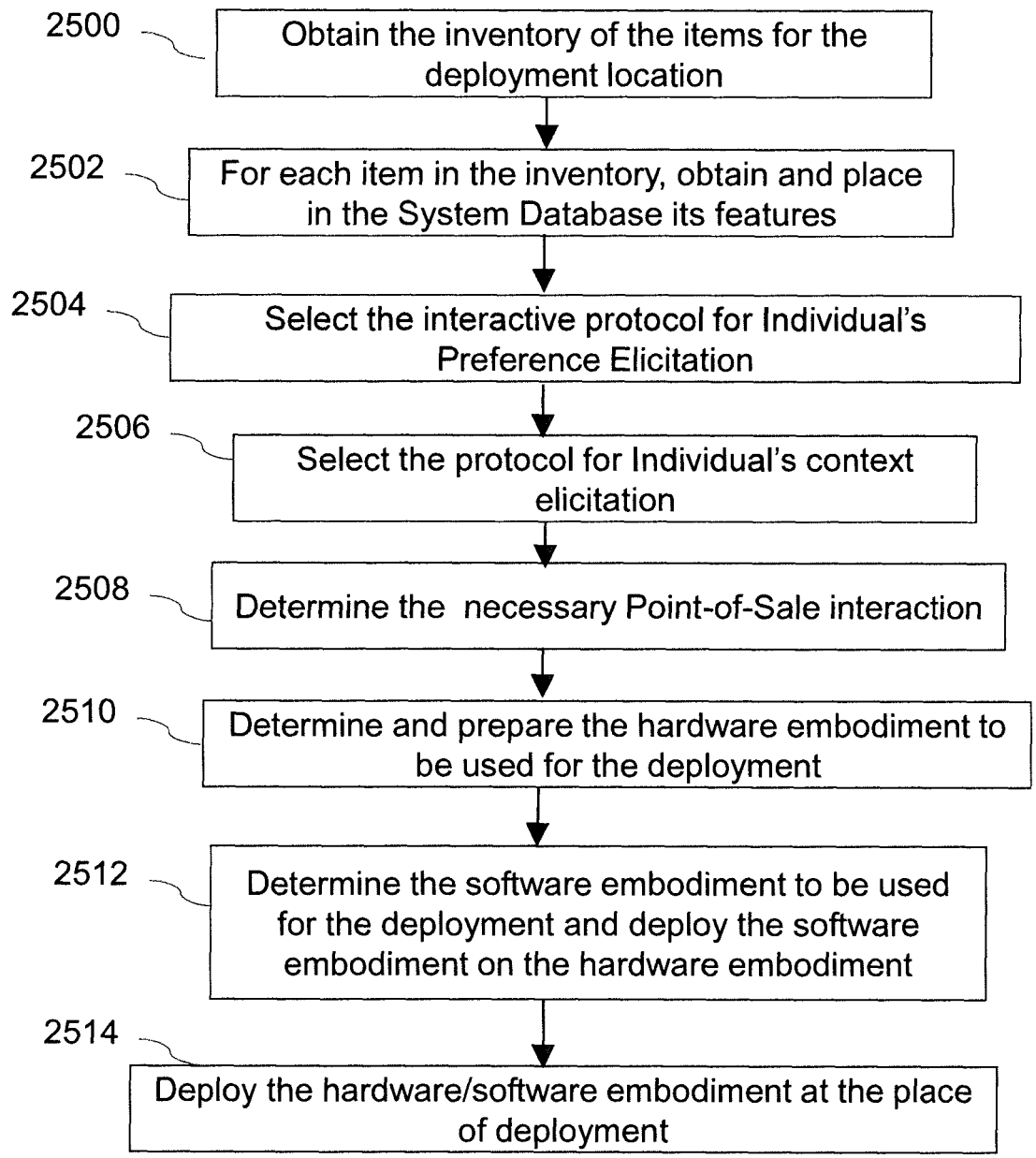
FIG. 25 is a flowchart of a process for deploying a recommendation system.

Referring next to FIG. 25, a flowchart of a process for deploying one recommendation system is shown in one embodiment of the present invention. Shown are an obtain inventory step 2500, an obtain item features step 2502, a select preference protocol step 2504, a select context protocol step 2506, a determine POS interaction step 2508, a determine hardware embodiment step 2510, a determine software embodiment step 2512, and a deploy software/hardware embodiment step 2514.

In the first obtain inventory step 2500, inventory data is obtained for the items and the inventory data is placed in the inventory data file 1012. The inventory data may be provided by the store or client or access to external inventory data may be provided. In the next obtain item features step 2502, feature data for each item is obtained and placed in the item features data file 1004. Feature data includes chemistry-based features such as amount of certain chemical compounds and percent alcohol. The process then proceeds to the select preference protocol step 2504.

In the select preference protocol step 2504, at least one user preference protocol is selected from the user preference elicitation protocols data file 1020.

In the next select context protocol step 2506, at least one context and/or filtering protocol is selected from the item filter criteria elicitation protocols data file 1018. The process then proceeds to the determine POS interaction step 2508.

During the determine POS interaction step 2508, a necessary POS interaction is determined. An example of POS interaction is connecting to a POS system with API calls. Proceeding to the next determine hardware embodiment step 2510, a hardware embodiment is determined. For example, a hardware embodiment including a computer is determined and prepared by an assembling and purchasing team.

In the next determine software embodiment step 2512, a software embodiment to be used for the deployment is determined and the software deployed on the hardware embodiment. For example, software necessary for the system deployment is determined and installed on the hardware.

In the final deploy software/hardware embodiment step 2514, the system is deployed at the place of deployment. For example, the hardware and software are deployed at a store.

Figure 26:
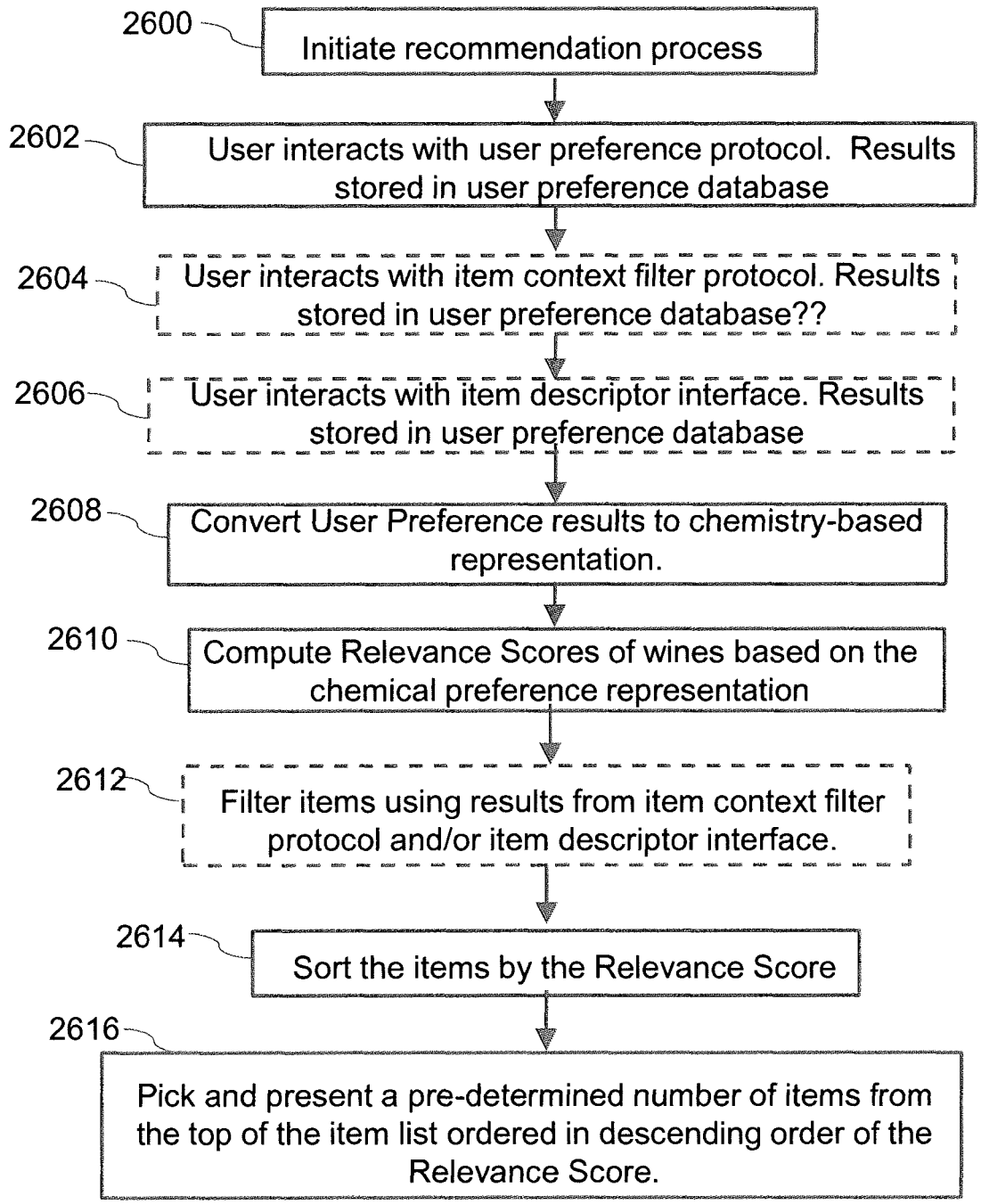
FIG. 26 is a flowchart for an exemplary recommendation process.

Referring next to FIG. 26, a flowchart for an exemplary recommendation process is shown in one embodiment of the present invention. Shown are an initiate process step 2600, a user preference protocol interaction step 2602, a context filter protocol interaction step 2604, a descriptor interaction step 2606, a convert user preference results step 2608, a compute relevance scores step 2610, a filter items step 2612, a sort items step 2614, and a present recommendation step 2616.

In the first initiate process step 2600, the recommendation process is initiated. Typically, the process is initiated by the recommendation engine 110 of the recommendation system 100, 200, 300, 500, 600 receiving an indication from a user. For example, the indication may be sent via an app on a mobile device over a network, or input via an application running on a kiosk at a store.

In the next user preference protocol interaction step 2602, the user is presented with a user preference protocol and provides responses to the questions presented user preference protocol. An example of a question included in the user preference protocol is "How do you take your coffee or tea?". The questions typically refer to sensory preferences such as taste and smell.

In the next optional context filter protocol interaction step 2604, the user is optionally presented with a context and/or filter protocol and provides responses to the context/filter protocol. An example of a question included in the context/filter protocol is "What occasion are you looking to buy a wine for?"

The next descriptor interaction step 2606 is also optional. During the descriptor interaction step 2606 the user is presented with a plurality of terms/descriptors that may be used to describe different versions of the item. The terms may be adjectives or nouns. The user selects one or more terms/descriptors. The exemplary term selection user interface 3100 for selecting terms is shown below in FIG. 31.

Next, during the convert user preference results step 2608, one or more mapping tables are used to convert the user preferences stored in the user preferences data file 1008 to a chemistry-based representation and store the representation in the user preferences data file 1008. An example of a mapping table used to convert user preference responses to chemistry-based representations is shown in the exemplary chemistry feature-to-response mapping table 1900 of FIG. 19. The user preference data for that user is then updated using the values of the chemistry feature-to-response mapping table 1900.

In the next compute relevance scores step 2610, a relevance score for each item is computed based on the similarity between the properties for each item and the user preference data for the item. The relevance scores can be distance metric between the user preference value for a chemistry-based property as compared to the chemistry-based property value. For example, the relevance scores can be the Euclidean distance between vectors in feature space. Alternatively, the relevance scores can be calculated based on probability of a person with the given user preference values liking an item with given chemical features. For example, the relevance score is calculated as a 75% chance of the user liking the item since 75% of users who share similar user preferences with the user have liked the same wine. Additionally, any combination of relevance score computing methods can be used. For example, the distance metric can be Euclidean distance, and the probability can be computed based on Bayesian theorem. For example, the relevancy score is computed by computing the Euclidean distance between the user preference for certain chemical compounds (such as an exemplary user preference Oak=5, TA=5 and RS=5) and features of a wine item (such as an exemplary wine item Oak=3, TA=7, RS=3) as the square root of $[(5-3)^2+(5-7)^2+(5-3)^2]$.

During the next optional filter items step 2612, if responses were provided in the context filter protocol interaction step 2604 and/or the descriptor interaction step 2606, items are filtered out of the list based on the responses received.

In the next sort items step 2614, the items (or remaining items) are sorted by relevance score. For example, the items are sorted in descending order of relevance score.

In the final present recommendation step 2616, the recommendation engine 110 selects a pre-determined number of items from the top of the list of items (i.e. the items that most closely match the input criteria). The information regarding the selected items is presented to the user. For example, for wine items the wines with the top three relevancy scores are presented to the user as recommended wines.

Referring again to FIG. 26, the exemplary recommendation process in one embodiment of the present invention is shown for any time of item with chemistry-based features that can be mapped to user input. In one embodiment of the exemplary recommendation process the items are wines. The recommendation process for wines includes protocols specifically aimed towards sensory preferences for wines, context in which the wine will be used, wine descriptor preference, and filters for wines (such as color or price).

Referring next to FIG. 27, an example of a first context-based user interface 2700 for a context-based question 2702 is shown. Shown are the first context-based question 2702 and a plurality of first context-based question responses 2704.

Shown in FIG. 27 is an example of a context-based user preference protocol question as presented to a user to provide input, for example via a touch-screen kiosk. The first context-based question 2702 is part of an item filter criteria elicitation protocol saved in the item filter criteria elicitation protocols data file 1018 and developed using a process similar to that described in FIG. 16.

The exemplary first context-based question 2702 is "What occasion are you looking to buy a wine for?" The available responses 2704 are "Dinner", Lunch", "A Party", "A Date", and "No Particular occasion". When the user selects one of the available responses 2704, items are selected using an event-to-item mapping table such as the exemplary event-to-item mapping table 2300 or an event-to-cluster mapping table such as the exemplary event-to-cluster mapping table 2400. For example, if the user selects the response "Party" and the event-to-item mapping table 2300 is used, only item 2 matches the "Party" context, thus only item 2 would be included in the recommendation.

Referring next to FIG. 28, an example of a second context-based user interface 2800 for the second context-based question 2802 is shown. Shown are the second context-based question 2802 and a plurality of second context-based question responses 2804.

Shown in FIG. 28 is another example of a context-based user preference protocol question as presented to the user to provide input, for example via a touch-screen kiosk. The second context-based question 2802 is part of an item filter criteria elicitation protocol saved in the item filter criteria elicitation protocols data file 1018 and developed using a process similar to that described in FIG. 16.

The exemplary second context-based question 2802 is "Which wine color(s) would you recommend? Select one or more" The available second context-based question responses 2804 are "White Wines", "Red Wines", "Rose Wines" and "Any Wines". In the second context-based user interface 2800, the user is permitted to select more than one choice. When the user selects one or more of the available second context-based question responses 2804, the items are filtered according to the responses selected. For example, if the user selects the responses "Red Wines" and "Rose Wines", the wines would be filtered to only include wines matching the red wine criteria and the rose wine criteria.

Figure 29:
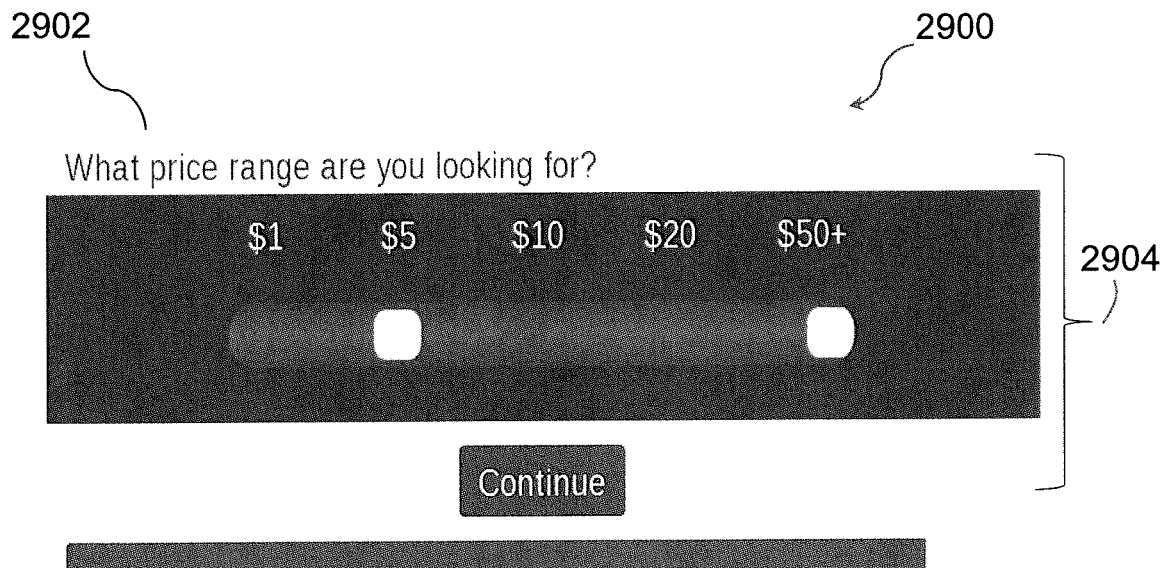
FIG. 29 is an illustration of a third context-based user interface for a third context-based question.

Referring next to FIG. 29, an example of a third context-based user interface 2900 for a third context-based question 2902 is shown. Shown are the third context-based question 2902 and a response slider 2904.

Shown in FIG. 29 is another example of one context-based user preference protocol question as presented to a user to provide input, for example via a touch-screen kiosk. The third context-based question 2902 is part of an item filter criteria elicitation protocol saved in the item filter criteria elicitation protocols data file 1018 and developed using a process similar to that described in FIG. 16.

The exemplary third context-based question 2902 is "What price range are you looking for?" The user is enabled to provide a response by moving two sliders along a range of prices from "$1" to "$50+" to indicate a lower price boundary and an upper price boundary. In the exemplary third context-based user interface 2900, the user has selected the lower bound of $5, and the upper bound of $50+. Items (in this example wines) are then filtered to exclude items with price values outside the boundaries.

Referring next to FIG. 30, an example of a fourth context-based user interface 3000 for a fourth context-based question 3002 is shown. Shown are the fourth context-based question 3002 and a plurality of fourth context-based question responses 3004.

Shown in FIG. 30 is another example of a context-based user preference protocol question as presented to the user to provide input, for example via a touch-screen kiosk. The fourth context-based question 3002 is part of an item filter criteria elicitation protocol saved in the item filter criteria elicitation protocols data file 1018 and developed using a process similar to that described in FIG. 16.

The exemplary fourth context-based question 3002 is "Would you like options to include sparkling and/or dessert wines? Select one or more." The available fourth question responses are "Sparkling Wine" and "Dessert Wine". When the user selects one or more of the available fourth context-based question responses 3004, the items are filtered according to the responses selected. For example, if the user selects the response "Sparkling Wine" but not "Dessert Wine", items identified as sparkling wines are included but items identified as dessert wines are filtered out.

Referring next to FIG. 31, the term selection user interface 3100 is shown in one embodiment of the present invention. Shown are the term selection user interface 3100, a term selection question 3102, and a plurality of terms 3104.

The term selection user interface 3100 is used for the user to select one or more terms (also referred to as descriptors) that are used to filter the items. In the exemplary term selection user interface 3100 the terms are used to filter wines. Each term is mapped to items using a term-to-item mapping table (for example the term-to-item mapping table 1400 as shown in FIG. 14) or to clusters using a term-to-cluster mapping table (for example the term-to-cluster mapping table 1500 as shown in FIG. 15). The recommendation engine 110 can then include items that match one or more of the terms, or increase the relevancy score based on how many of the selected terms are matched with the item.

Figure 32:
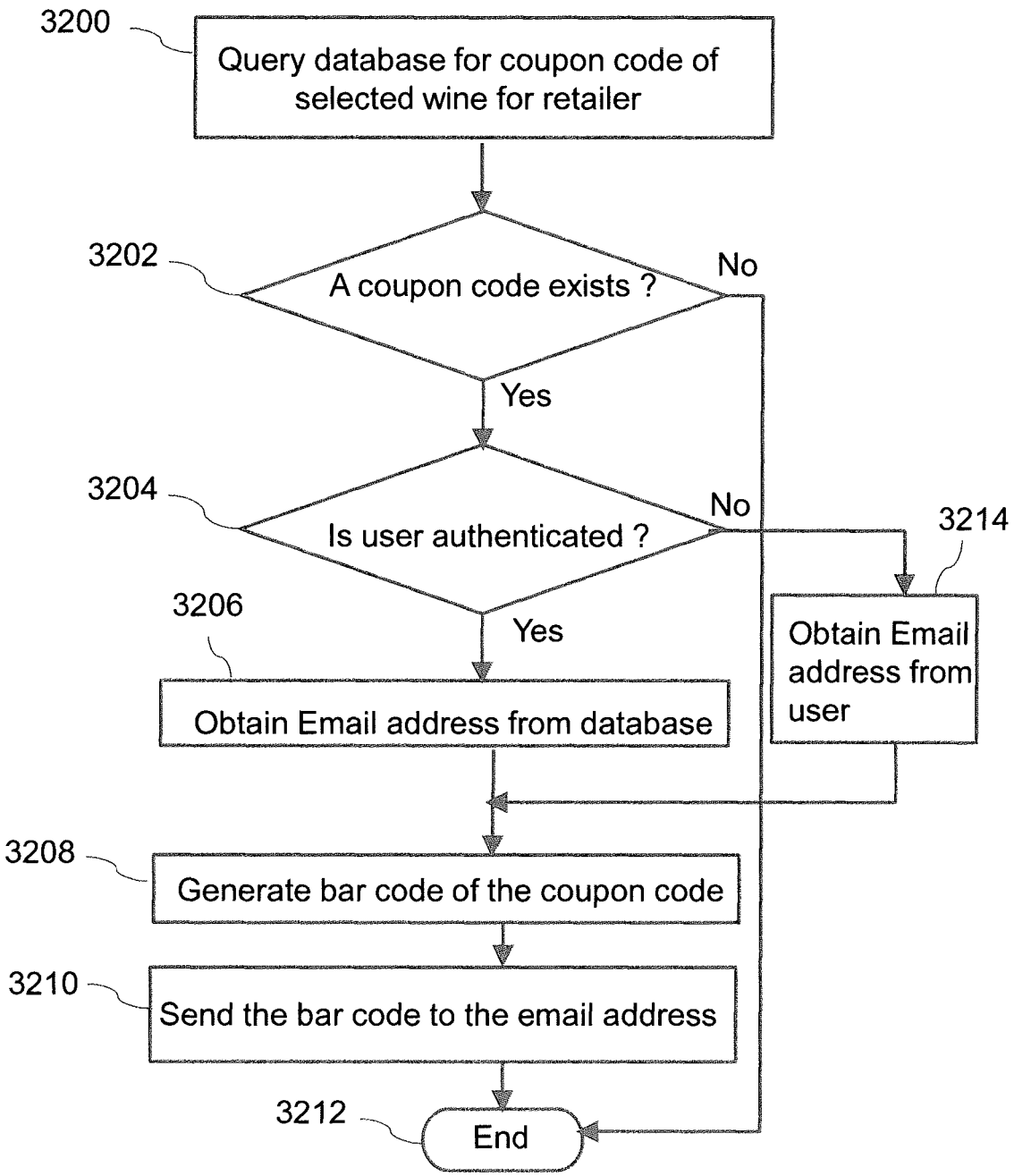
FIG. 32 is a flowchart for a coupon generation process.

Referring next to FIG. 32, a flowchart for a coupon generation process is shown in one embodiment of the present invention. Shown are a coupon query step 3200, a coupon existence decision point 3202, an user authenticated decision step 3204, an obtain email address from database step 3206, a generate bar code step 3208, a send bar code step 3210, an end step 3212, and an obtain email address step 3214.

In the first coupon query step 3200, the coupon generation module 302 queries the coupon code data file 1028 stored in the database 804 for a coupon code for a first item. The process then proceeds to the coupon existence decision point 3202.

In the coupon existence decision point 3202, if a coupon code is found for the first item, the process proceeds to the user authenticated decision point 3204. If a coupon code is not found for the first item, the process proceeds to the end step 3212 and the process ends.

In the user authenticated decision step 3204, the coupon generation module 302 checks whether or not the user is authenticated. The user is authenticated if the user is already included in the database 804. If the user is authenticated, the process proceeds to the obtain email address from database step 3206, and the coupon generation module 302 retrieves the use email from the user profile stored in the user profile data file 1006. The process then proceeds to the generate bar code step 3208

If the user is not authenticated, the process proceeds to the obtain email address step 3214 and the coupon generation module 302 prompts the user to enter a valid email address and receives the email address. The process then proceeds to the generate bar code step 3208.

During the generate bar code step 3208 the coupon generation module 302 generates a bar code corresponding to the coupon code found. The process then proceeds to the next send bar code step 3210.

In the send bar code step 3210, the coupon generation module 302 sends an email including the generated bar code to the email address. The process then sends in the end step 3212.

Figure 33:
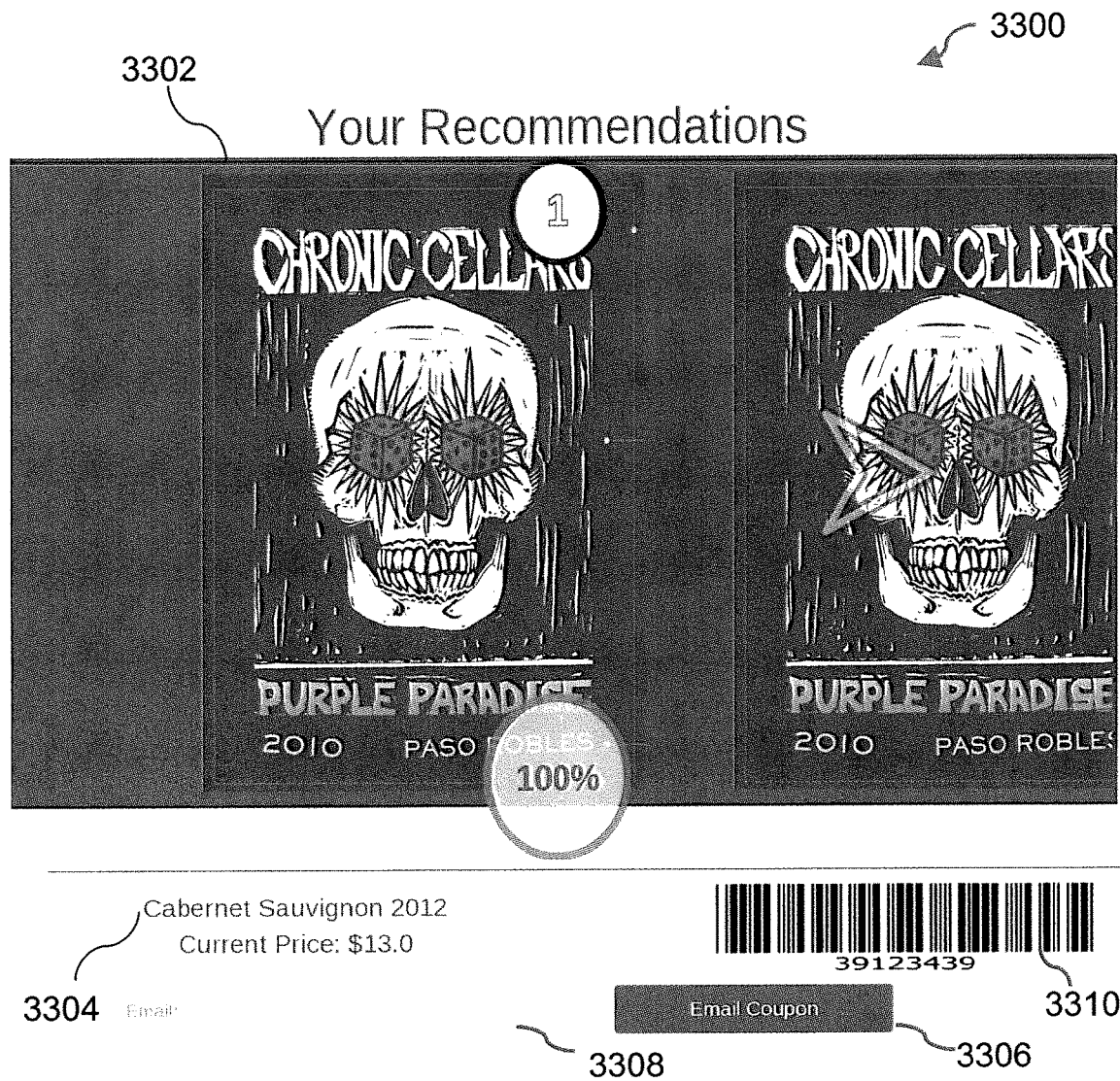
FIG. 33 is an illustration of an exemplary recommendation user interface.

Referring next to FIG. 33, an exemplary recommendation user interface 3300 is shown in one embodiment of the present invention. Shown are a recommended item graphic 3302, a recommended item label 3304, an email coupon button 3306, an email entry box 3308, and a coupon bar code 3310.

Shown in the recommendation user interface 3300 of FIG. 32 is a user interface presented to the user after the recommendation process of FIG. 25 has been completed and the items have been filtered and ordered. In the example of FIG. 33, the items recommended are wines. In the recommendation user interface 3300, at least one recommended item is identified. In the example of FIG. 33, the first, i.e. most recommended, wine is indicated. Identifying information for the most recommended wine includes the recommended item graphic 3302, which includes a graphic of a label of the wine, as well as ordinal indication of the position of the wine on the list ($1^{st}$ in this example) and the percent matching of the wine (100% in this example). The identifying information also includes the recommended item label 3304 which in this example includes the name, vintage year and current price of the recommended wine. It will be understood that while a single wine is shown in the exemplary recommendation user interface 3300, multiple items could be shown simultaneously, for example in a table.

The exemplary recommendation user interface 3300 also includes the email coupon button 3306, the email entry box 3308, and the coupon bar code 3310. As previously described in FIG. 31, the coupon generation module 302 determines if a coupon code is available. In the example of FIG. 33 a coupon code has been found for the item and the coupon bar code 3310 is displayed. In the example of FIG. 33, the user email address is not available so the email entry box 3308 is used for the user to enter his email address. The user then presses the email coupon button 3306, which causes the coupon generation module 302 to email the coupon bar code 3310 to the email address input by the user.

Figure 34:
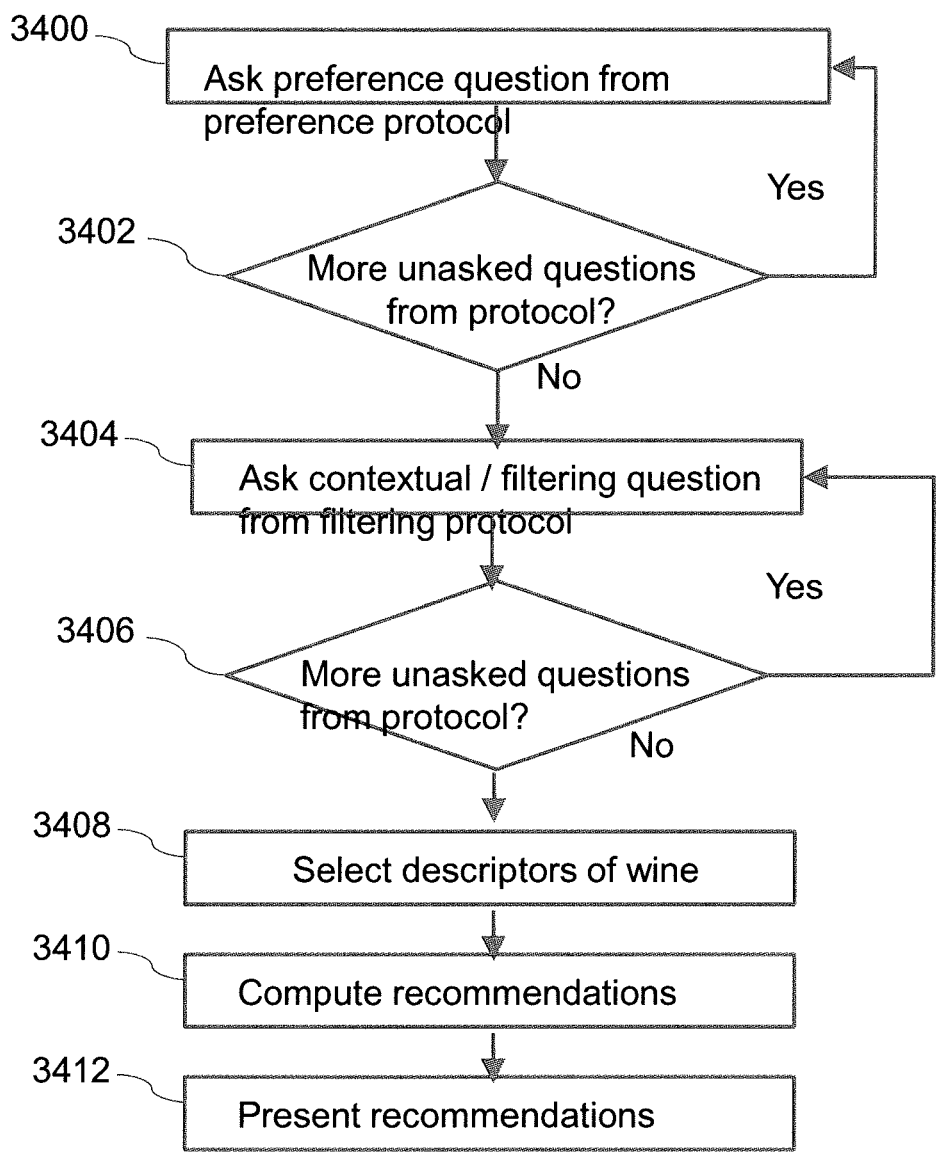
FIG. 34 is a flowchart for a recommendation generation process.

Referring next to FIG. 34, a flowchart for a recommendation generation process is shown in another embodiment of the present invention. Shown are an ask preference protocol question step 3400, an unasked preference questions decision point 3402, an ask contextual/filtering question step 3404, an unasked contextual/filtering questions decision point 3406, a select descriptors step 3408, a compute recommendations step 3410, and a present recommendations step 3412.

Shown in FIG. 34 is a flowchart for the exemplary recommendation process. The user may interface with the process using the kiosk 808 with a screen and configured for user input, or a computing device application, or other suitable device for soliciting and receiving user input and communicating with the required engines and/or modules over a network.

In the first ask preference protocol question step 3400, the user preference determination engine 114, using a user preference protocol selected from the user preference elicitation protocols data file 1020, presents an unasked question from the selected protocol to the user. The user inputs the response, which is stored in the user preferences data file 1008. An example of a user interface during the ask preference protocol question step 3400 is shown in FIG. 18. The process then proceeds to the next unasked preference questions decision point 3402.

In the unasked preference questions decision point 3402, the user preference determination engine 114 determines if there are remaining unasked user preference protocol questions. If there are remaining unasked user preference protocol questions, the process returns to the ask preference protocol question step 3400 and another question is presented to the user.

If all user preference protocol questions have been asked, the process proceeds to the ask contextual/filtering question step 3404.

In the ask contextual/filtering question step 3404, the item filtering criteria generation engine 204, using a contextual/filtering protocol selected from the item filter criteria elicitation protocols data file 1018, presents an unasked question from the selected context/filtering protocol to the user. The user inputs the response, which is stored in the user preferences database 1008. An example of a user interface during the ask contextual/filtering question step 3404 is shown in FIGS. 26-29. The process then proceeds to the next unasked contextual/filtering questions decision point 3406.

In the unasked contextual/filtering question decision point 3406, item filtering criteria generation engine 204 determines if there are remaining unasked context/filtering protocol questions. If there are remaining unasked context/filtering protocol questions, the process returns to the ask contextual/filtering question step 3404 and another question is presented to the user.

If all contextual/filtering protocol questions have been asked, the process proceeds to the select descriptors step 3408.

During the select descriptors step 3408, the item descriptor elicitation engine 206 presents a plurality of descriptors (terms) to the user. The user selects one or more descriptors. An example of a user interface during the select descriptors step 3408 is shown in FIG. 30. The process then proceeds to the compute recommendations step 3410.

During the compute recommendations step 3410, the recommendation system 100, 200, 300, 600 computes item recommendations based on the user responses of the previous steps. The user preference—item feature mapping module 1022 maps the responses to values for chemistry-based features, using data such as the mappings of user responses to item features data file 1022 previously described. In one embodiment, a cluster of items is selected for recommendation. The selected cluster of items is selected using the term-to-cluster mapping module 202, which selects a cluster of items that best matches the descriptors selected by the user in the select descriptors step 3408. Filtering may be done by the recommendation engine 110 after selecting the cluster of items. The recommendation engine 110 retrieves items belonging to the selected cluster. The recommendation engine 110 also filters the items based on the user responses to the context/filtering protocol. In some embodiments, the inventory data file 1012 is checked and only items currently in stock are included. The recommendation engine 110 then computes the relevance score for each remaining item, as previously described. The process then proceeds to the present recommendations step 3412.

In the final present recommendations step 3412, the recommendation engine 110 presents the recommendations to the user via the user interface. The recommendation engine 110 selects a predetermined number of items from the top of the list (i.e. with the highest relevancy score). A coupon code (such as the exemplary coupon code 3310) can also be shown. An exemplary user interface during the present recommendations step 3412 is shown in FIG. 32.

Referring next to FIG. 35, a chemical compound-to-user mapping table 3500 is shown in another embodiment of the present invention. Shown are the plurality of user identifications 2002, a plurality of chemical compounds 3504, and a plurality of chemical compound values 3506.

The chemical compound-to-user mapping table 3500 includes a plurality of rows with each row associated with one user identification 2002. Each column is associated with one chemical compound 3504. The chemical compounds 3504 are chemical compounds and/or groups of chemical compounds found in the item.

The chemical compound values 3506 for each cell indicate the degree of each user's preference for each chemical compound or group of compounds. In the embodiment shown, the chemical compound values 3506 are represented by numerical values with higher values indicating a higher user preference and lower values indicating lower user preference.

The chemical compound values 3506 are determined by execution of one or more user preference protocols including at least one unit of inquiry. The choosing of responses by the user will change the value of chemical compound values 3506 as determined by an associated mapping table.

Referring next to FIG. 36, the flavor descriptor chart 3600 including the plurality of flavor descriptors 2104 is shown. As previously described, descriptors are used to relate subjective ways for the user to describe a preferred item with quantitative item properties. The plurality of flavor descriptors shown relate to sensory input such as tastes and smells. It will be understood that the flavor descriptors 2104 shown in the flavor descriptor chart 3600 is not an exhaustive list and additional flavor descriptors may be included in the inventions as described herein.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. An item recommendation system comprising:
a chemical analysis system configured to chemically analyze items and determine for each analyzed item data including an objectively-measured quantity for each of a plurality of chemistry-based item features, wherein each chemistry-based item feature is a chemical compound or a chemical property;
a database including data for a first plurality of items in a category, the data having been obtained as a result of each item having been analyzed by the chemical analysis system and including an objectively-measured quantity for at least one chemistry-based item feature for each item;
a learning module configured to run on a computing device having a processor and non-transitory memory and configured to perform the steps of:
receive data from a plurality of users including user information regarding user preference for a second plurality of items in the same category as the first plurality of items;
receive data for the second plurality of items including an objectively-measured quantity for at least one chemistry-based item feature for each item;
determine a plurality of questions, wherein each question is associated with a set of responses, and wherein at least one of the questions asks about a sensory preference; and
determine, using the data for the second plurality of items and the data from the plurality of users, a numerical correlation between each response of each question and at least one chemistry-based item feature; and
at least one recommendation module configured to run on a computing device having a processor and non-transitory memory, the recommendation module in communication with the database and configured to perform the steps of:
present to a user a plurality of questions selected from the determined plurality of questions;
receive from the user, for each selected question, a response selected from the set of associated responses;
assign to the user, based on the received user responses, a set of user preference values, wherein each user preference value is associated with one chemistry-based item feature;
for each received response, apply the numerical correlation to the user preference value for each chemistry-based item feature associated with the response;
compute a relevancy score for each of the first plurality of items based at least in part on comparing, for each user preference value, the user preference value with the measured quantity for the associated chemistry-based item feature; and
select at least one item from the first plurality of items based at least in part on the computed relevancy scores.

2. The item recommendation system of claim 1, wherein the items are wines.

3. The item recommendation system of claim 2, wherein the at least one chemistry-based item feature includes at least one chemical compound found in wine.

4. The item recommendation system of claim 2, wherein the at least one chemistry-based item feature includes at least one chemical property of wine.

5. The item recommendation system of claim 1, the recommendation module further configured to perform the steps of:
receive at least one user filtering response;
filter the first plurality of items in response to the at least one user filtering response.

6. The item recommendation system of claim 5, wherein each of the first plurality of items is associated with at least one event, and the at least one user filtering response indicates at least one event.

7. The item recommendation system of claim 5, wherein each item of the first plurality of items is associated with at least one wine type, and the at least one user filtering response indicates at least one wine type.

8. The item recommendation system of claim 5, wherein each item of the first plurality of items is associated with a price, and the at least one user filtering response indicates a price range.

9. The item recommendation system of claim 1, wherein the data for the first plurality of items includes at least one item descriptor for each item, and wherein the recommendation module is further configured to perform the step of:
receive at least one user item descriptor, and wherein the computing of the relevancy score is based at least in part on comparing, for each item of the first plurality of items, the at least one item descriptor with the at least one user item descriptor.

10. The item recommendation system of claim 1 wherein the learning system is further configured to determine a plurality of user preference protocols, wherein each user preference protocol includes a plurality of questions selected from the determined plurality of questions; and
wherein the recommendation module is further configured to select one from the plurality of user preference protocols, whereby the questions selected from the determined plurality of questions are the questions comprising the user preference protocol.

11. An item recommendation system comprising:
a chemical analysis system configured to chemically analyze items and determine for each analyzed item data including an objectively-measured quantity for each of a plurality of chemistry-based item features, wherein each chemistry-based item feature is a chemical compound or a chemical property;
a database including data for a first plurality of items in a category, wherein each item is associated with one cluster of items, the data having been obtained as a result of each item having been analyzed by the chemical analysis system and including, for each cluster, a numerical association between each of a plurality of descriptor terms and the cluster, the data further comprising an objectively-measured quantity for at least one chemistry-based item feature for each item;
a learning module configured to run on a computing device having a processor and non-transitory memory and configured to perform the steps of:
receive data from a plurality of users including user information regarding user preference for a second plurality of items in the same category as the first plurality of items;
receive data for the second plurality of items including an objectively-measured quantity for at least one chemistry-based item feature for each item;

determine a plurality of questions, wherein each question is associated with a set of responses, and wherein at least one of the questions asks about a sensory preference; and determine, using the data for the second plurality of items and the data from the plurality of users, a numerical correlation between each response of each question and at least one chemistry-based item feature; and at least one recommendation module configured to run on a computing device comprising a processor and a non-transitory memory and configured to perform the steps of:

present to a user a plurality of questions selected from the determined plurality of questions;

receive from the user a response selected from the set of associated responses;

present to a user a plurality of the descriptor terms;

receive from the user a selection of at least one descriptor term;

compute a score for each cluster based on the numerical associations between the selected descriptor terms and the clusters;

select a cluster based at least in part on comparing the cluster scores;

receive from the user, for each selected question, a response selected from the set of associated responses;

assign to the user, based on the received user responses, a set of user preference values, wherein each user preference value is associated with one chemistry-based item feature;

for each received response apply the numerical correlation to the user preference value for each chemistry-based item feature associated with the response; and compute a relevancy score for each item in the selected cluster based at least in part on comparing, for each user preference, the user preference value with the measured quantity for the associated chemistry-based item feature.

12. The item recommendation system of claim 11, the recommendation module further configured to perform the step of recommend at least one item from the selected cluster based at least in part on the computed relevancy scores.

13. The item recommendation system of claim 11, wherein the items are wines, the at least one recommendation module further configured to perform the steps of:
select a representative wine from the selected item cluster; and
recommend the representative wine.

14. The item recommendation system of claim 11, wherein the user preference response is a user selection of one of a plurality of multiple choice responses.

15. The item recommendation system of claim 14, wherein the database includes a data file mapping each multiple choice response to a measured quantity for one chemistry-based item feature.

16. A method for recommending an item from a first plurality of items in a category, comprising the steps of:
determining, using a chemical analysis system configured to chemically analyze items, data for each of the first plurality of items, wherein the data obtained by the chemical analysis system for each item includes an objectively-measured quantity for each of a plurality of chemistry-based item features, wherein each chemistry-based item feature is a chemical compound or a chemical property;

receiving, by a learning module configured to run on a computing device having a processor and non-transitory memory, of data from a plurality of users including user information regarding user preference for a second plurality of items in the same category as the first plurality of items;

receiving data for the second plurality of items including an objectively-measured quantity for at least one chemistry-based item feature for each of the second plurality of items, the data including an objectively-measured quantity for at least one chemistry-based item feature for each of the second plurality of items wherein each chemistry-based item feature is a chemical compound or a chemical property;

determining, by the learning module, of a plurality of questions, wherein each question is associated with a set of responses, and wherein at least one of the questions asks about a sensory preference;

determining, using the data for the second plurality of items and the data from the plurality of users, a numerical correlation between each response of each question and at least one chemistry-based item feature;

determining, by at least one recommendation module configured to run on a computing device having a processor and non-transitory memory, and in communication with a database including data for the first plurality of items, the data including an objectively-measured quantity for at least one chemistry-based item feature;

presenting to a user, by the recommendation module, a plurality of questions selected from the determined plurality of questions;

receiving, by the recommendation module, for each presented question a user response selected from the set of associated responses;

assigning to the user, by the recommendation module based on the received user responses, a set of user preference values, wherein each user preference value is associated with one chemistry-based item feature;

for each received response, applying the numerical correlation to the user preference value for each chemistry-based item feature associated with the response, computing, by the recommendation system, a relevancy score for each of the first plurality of items based at least in part on comparing the user preference value with the measured quantity for the associated chemistry-based item feature; and selecting at least one item from the first plurality of items based at least in part on the computed relevancy scores.

17. The method for recommending an item of claim 16, wherein the items are wines.

18. The method for recommending an item of claim 17, wherein the chemistry-based item features include at least one chemical compound found in wine.

19. The method for recommending an item of claim 16, wherein the chemistry-based item features include at least one chemical property of wine.

20. The method for recommending an item of claim 16, further comprising the steps of:
receiving at least one user filtering response;
filtering the first plurality of items in response to the at least one user filtering response.

21. The method for recommending an item of claim 16, wherein each item is associated with at least one item descriptor, and further comprising the steps of receiving at least one user item descriptor, and wherein the computing of the relevancy score is based at least in part on comparing, for each item of the first plurality of items, the at least one item descriptor with the at least one user item descriptor.

* * * * *